(12) United States Patent
Palenius et al.

(10) Patent No.: US 12,684,639 B2
(45) Date of Patent: Jul. 14, 2026

(54) METHODS FOR SIMULTANEOUS COMMUNICATION USING A PLURALITY OF SUBSCRIBER IDENTITIES, A RELATED WIRELESS DEVICE AND A RELATED NETWORK NODE

(71) Applicant: Sony Group Corporation, Tokyo (JP)

(72) Inventors: Torgny Palenius, Barsebäck (SE);
Anders Berggren, Lund (SE); Lars Nord, Lund (SE)

(73) Assignee: Sony Group Corporation, Tokyo (JP)

( * ) Notice: Subject to any disclaimer, the term of this patent is extended or adjusted under 35 U.S.C. 154(b) by 311 days.

(21) Appl. No.: 18/290,557

(22) PCT Filed: May 19, 2022

(86) PCT No.: PCT/EP2022/063652
§ 371 (c)(1),
(2) Date: Nov. 14, 2023

(87) PCT Pub. No.: WO2022/248340
PCT Pub. Date: Dec. 1, 2022

(65) Prior Publication Data
US 2024/0251461 A1 Jul. 25, 2024

(30) Foreign Application Priority Data
May 27, 2021 (SE) .................................... 2150676-1

(51) Int. Cl.
*H04W 76/15* (2018.01)
*H04W 8/20* (2009.01)
(Continued)

(52) U.S. Cl.
CPC ............. *H04W 76/15* (2018.02); *H04W 8/20* (2013.01); *H04W 28/0278* (2013.01); *H04W 76/28* (2018.02)

(58) Field of Classification Search
CPC ................................................. H04W 28/0278
See application file for complete search history.

(56) References Cited

U.S. PATENT DOCUMENTS

| 12,309,736 B2 * | 5/2025 | Youn ................... H04W 60/005 |
| 2014/0038601 A1 * | 2/2014 | Gouriou .................. H04W 8/18 |
| | | 455/435.1 |

(Continued)

FOREIGN PATENT DOCUMENTS

| EP | 2605555 A2 * | 6/2013 | ........... H04B 1/0067 |
| WO | 2021007696 A1 | 1/2021 | |

OTHER PUBLICATIONS

International Search Report and Written Opinion from corresponding International Application No. PCT/EP2022/063652, mailed on Sep. 23, 2022, 12 pages.

(Continued)

*Primary Examiner* — Pamit Kaur
(74) *Attorney, Agent, or Firm* — Tucker Ellis LLP

(57) ABSTRACT
A method is disclosed, performed by a wireless device, for simultaneous communication using a plurality of subscriber identities. The method comprises establishing, with a first network node, a first radio connection. The first radio connection is associated with a first subscriber identity out of the plurality of subscriber identities. The method comprises establishing, with a second network node, a second radio connection. The second radio connection is associated with the second subscriber identity out of the plurality of subscriber identities. The method comprises transmitting, to the first and/or the second network node, a control message indicating that the wireless device intends to communicate simultaneously using more than one of the plurality of subscriber identities. The method comprises communicating over one of the first and the second established radio connections at a time, wherein scheduling of data on one of
(Continued)

the first and the second established radio connections is paused during time periods when the wireless device is communicating using the other established radio connection.

19 Claims, 10 Drawing Sheets

(51) Int. Cl.
  *H04W 28/02*        (2009.01)
  *H04W 76/28*        (2018.01)

(56)                    References Cited

U.S. PATENT DOCUMENTS

2018/0160422 A1 *  6/2018  Pathak .................. H04W 76/10
2020/0304984 A1    9/2020  Dhanapal
2021/0105607 A1    4/2021  Ioffe

OTHER PUBLICATIONS

Office Action and Search Report from corresponding Swedish Application No. 2150676-1, mailed on Jan. 28, 2022, 12 pages.
Vivo, "[post11-e][256][Multi-SIM] Network switching details (vivo)," 3GPP TSG-RAN Meeting #113-e, R2-2100474, Jan. 25-Feb. 5, 2021, 47 pages.
Samsung, "Summary of AI 8.3.3: UE notification on network switching for multi-SIM," 3GPP TSG-RAN WG2 Meeting #113bis-e, R2-2104319, Apr. 12-Apr. 20, 2021, 14 pages.

* cited by examiner

S102 Establishing, with a first network node, a first radio connection associated with a first subscriber identity out of the plurality of subscriber identities S104 Establishing, with a second network node, a second radio connection associated with the second subscriber identity out of the plurality of subscriber identities S106 Transmitting, to the first and/or the second network node, a control message indicating that the wireless device intends to communicate simultaneously

S106A

S107 Receiving, from the first and/or the second network node, information indicative of a DRX configuration for one of the first and the second established radio connections S108 Communicating over one of the first and the second established radio connections at a time

S108A

S110 Switching from communicating over the first established radio connection to communicating over the second established radio connection

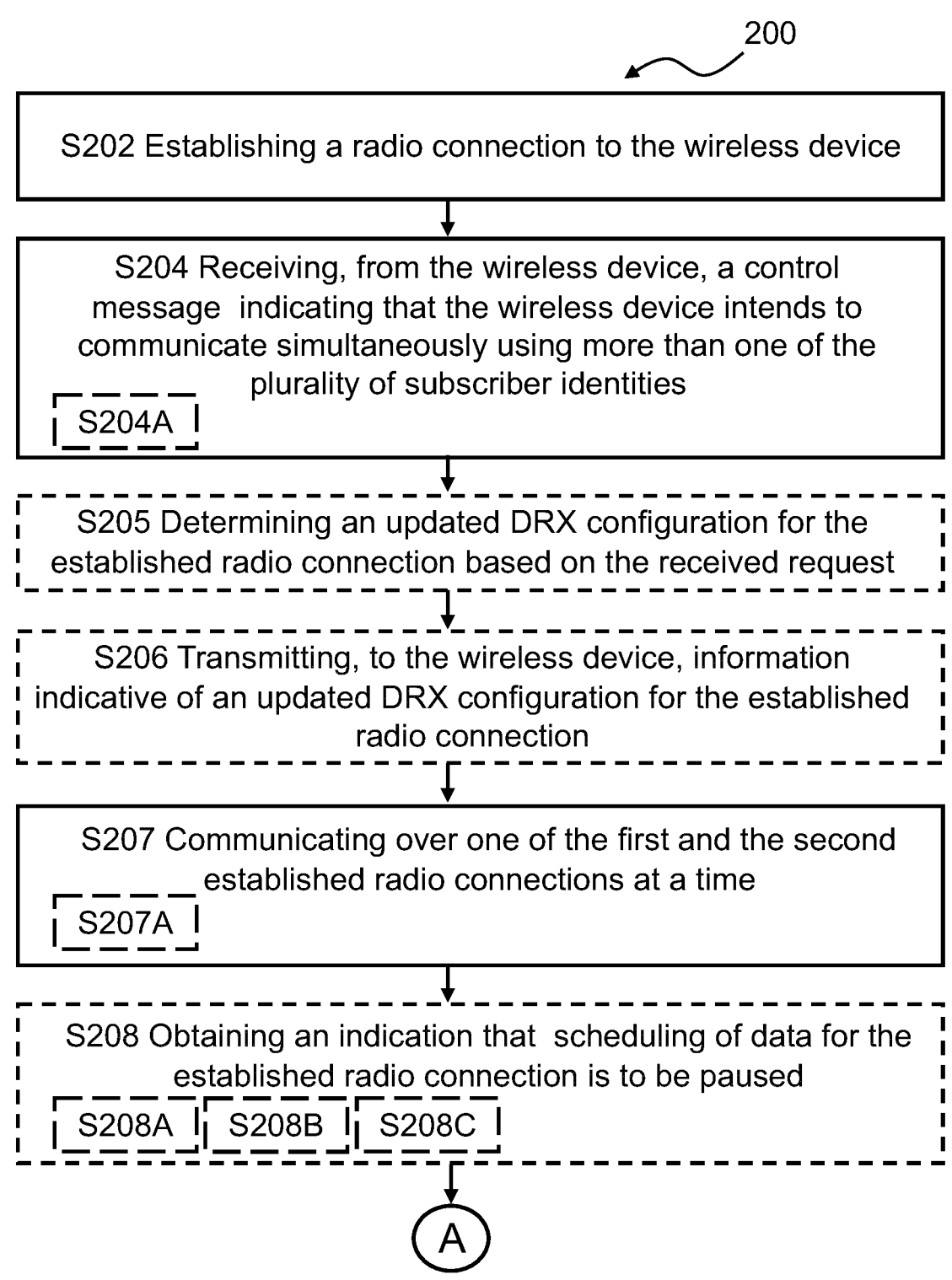

200

S202 Establishing a radio connection to the wireless device

S204 Receiving, from the wireless device, a control message indicating that the wireless device intends to communicate simultaneously using more than one of the plurality of subscriber identities

S204A

S205 Determining an updated DRX configuration for the established radio connection based on the received request S206 Transmitting, to the wireless device, information indicative of an updated DRX configuration for the established radio connection S207 Communicating over one of the first and the second established radio connections at a time

S207A

S208 Obtaining an indication that scheduling of data for the established radio connection is to be paused

METHODS FOR SIMULTANEOUS COMMUNICATION USING A PLURALITY OF SUBSCRIBER IDENTITIES, A RELATED WIRELESS DEVICE AND A RELATED NETWORK NODE

The present disclosure pertains to the field of wireless communications. The present disclosure relates to methods for simultaneous communication using a plurality of subscriber identities, methods for enabling communication with a wireless device using a plurality of subscriber identities, a related wireless device and a related network node.

BACKGROUND

A wireless device may be able to communicate using a plurality of subscriber identities, for example when the wireless device includes two or more subscriber identity modules (SIMs), such as Universal Subscriber Identity Modules (USIM) configured to communicate with two or more corresponding networks. However, as of today such a wireless device cannot be in a connected state and communicate with both networks simultaneously when using a single receiver and/or a single transmitter. Hence, a single receiver, Rx, wireless device or a single transmitter, Tx, wireless device is typically unable perform two or more receptions or transmissions respectively, even when having two or more SIMs. Even dual RX/TX wireless devices may have issues keeping two SIMs active at the same time, due to for example self-blocking and/or intermodulation.

SUMMARY

In other words, a single Rx wireless device or a single Tx wireless device is today only capable of having one connection at a time. Therefore, there is a need for enabling two or more connections in a single Rx case and in a single Tx case. In the current disclosure, a wireless device having single RX/TX is used to illustrate the problem and method disclosed herein, however the disclosed methods are also applicable to wireless devices having other hardware configurations, such as dual RX and dual TX.

Accordingly, there is a need for wireless devices and methods for simultaneous communication using a plurality of subscriber identities, which mitigate, alleviate or address the shortcomings existing and provide a solution which allows a wireless device having a single transmitter and/or receiver to communicate simultaneously using two or more subscriber identities.

A method is disclosed, performed by a wireless device, for simultaneous communication using a plurality of subscriber identities. The method comprises establishing, with a first network node, a first radio connection. The first radio connection is associated with a first subscriber identity out of the plurality of subscriber identities. The method comprises establishing, with a second network node, a second radio connection. The second radio connection is associated with the second subscriber identity out of the plurality of subscriber identities. The method comprises transmitting, to the first and/or the second network node, a control message indicating that the wireless device intends to communicate simultaneously using more than one of the plurality of subscriber identities. The method comprises communicating over one of the first and the second established radio connections at a time, wherein scheduling of data on one of the first and the second established radio connections is paused during time periods when the wireless device is communicating using the other established radio connection.

Further, a wireless device is provided, the wireless device comprising memory circuitry, processor circuitry, and a wireless interface, wherein the wireless device is configured to perform the method disclosed herein.

It is an advantage of the present disclosure that the wireless device can inform the network node that the wireless device intends communicating using a plurality of subscriber identities and can inform that it is capable of supporting a functionality that would allow communication over multiple different radio connections using multiple subscriber identities. Thereby, the wireless device may communicate its capability to communicate using multiple subscriber identities and may also inform and/or request that the wireless device can and/or intends to communicate with the network using multiple subscriber identities. By informing the network node that a radio connection with the network node is established using a subscriber identity comprised in a wireless device having a plurality of subscriber identities, the wireless device may instruct the network node to schedule data communication such that the data communication on one of the established radio connections is not scheduled at the same time as a data communication with another of the scheduled data connections. This allows a wireless device having a single transmitter and/or receiver to be simultaneously connected to and communicating with one or more network nodes using more than one subscriber identity. In other words, the wireless device may be connected to two different networks simultaneously without being configured for Dual transmitter- and/or receiver-operation. By continuously switching between the more than one established radio connections, the wireless device can use the single receiver and/or transmitter to communicate over the more than one established radio connections. Thereby the resources available for communication may be more efficiently used, which may reduce latency of the services provided over the established radio connections.

Further, a method is disclosed, performed in a network node, such as in a radio network node, for enabling communication with a wireless device using a plurality of subscriber identities. The method comprises establishing a radio connection to the wireless device, wherein the first radio connection is associated with a first subscriber identity out of the plurality of subscriber identities. The method comprises receiving, from the wireless device, a control message indicating that the wireless device intends to communicate simultaneously using more than one of the plurality of subscriber identities. The method comprises communicating with the wireless device over the established radio connection, wherein scheduling of data at one of the first and the second established radio connections is paused during time periods when the wireless device indicates that it is communicating using another subscriber identity.

Further, a network node is provided, the network node comprising memory circuitry, processor circuitry, and a wireless interface, wherein the network node is configured to perform the method disclosed herein.

It is an advantage of the present disclosure that the network node may be informed by the wireless device that the wireless device is communicating using a plurality of subscriber identities. Based on this information the network node may pause scheduling of data on a first established radio connection when the wireless device is communicating using a second established radio connection. This allows a wireless device having a single transmitter and/or receiver to be simultaneously connected to and communicating with one or more network nodes using more than one subscriber identity. In other words, the wireless device may be connected to two different networks simultaneously without being configured for Dual transmitter- and/or receiver-operation. By continuously switching between the more than one established radio connections, the wireless device can use the single receiver and/or transmitter to communicate over the more than one established radio connections. Thereby the resources available for communication may be more efficiently used, which may reduce latency of the services provided over the established radio connections.

BRIEF DESCRIPTION OF THE DRAWINGS

The above and other features and advantages of the present disclosure will become readily apparent to those skilled in the art by the following detailed description of examples thereof with reference to the attached drawings, in which:

FIG. 2 is a flow-chart illustrating an example method, performed in a wireless device, for simultaneous communication using a plurality of subscriber identities according to this disclosure, FIG. 5A-5B is a flow-chart illustrating an example method, performed in a network node of a wireless communication system, for enabling communication with a wireless device using a plurality of subscriber identities according to this disclosure.

DETAILED DESCRIPTION

Figure 1:
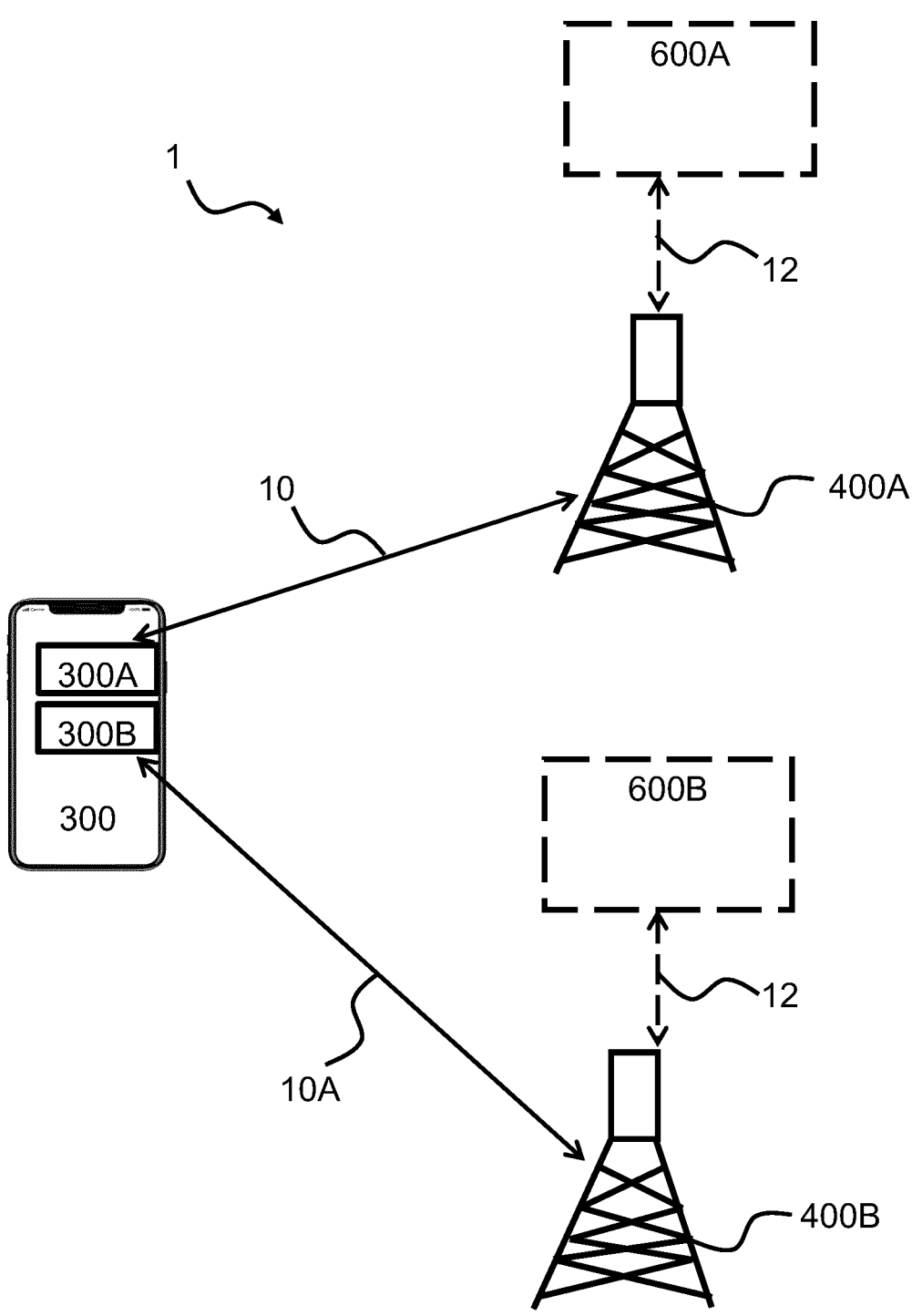
FIG. 1 is a diagram illustrating an example wireless communication system comprising an example network node and an example wireless device according to this disclosure.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example needs not have all the aspects or advantages shown. An aspect or an advantage described in conjunction with a particular example is not necessarily limited to that example and can be practiced in any other examples even if not so illustrated, or if not so explicitly described.

A connected mode, which may herein also be referred to as a connected state, may refer to an operation mode wherein data can be communicated e.g., between the wireless device and a network node or between the wireless device and another wireless device. A connected mode may be referred to an operation state wherein a radio transmitter and/or a radio receiver is activated for communication using an established radio connection. A connected mode may be referred to an operation state wherein the wireless device is synchronized time-wise and/or frequency-wise e.g. by a determined timing advance parameter for the communication. In certain communication systems, a connected mode may be referred to as a radio resource control (RRC) state. In one or more example, the connected mode may be an active state. In various examples, an active state may be a RRC connected state and/or an RRC active state. In one or more examples, the term connected state and connected mode may be used interchangeably.

A dormant mode is a mode where the wireless device has no active connection with the network node. A dormant mode may be seen as an inactive mode of the wireless device. A dormant mode may be seen as a mode where the wireless device is unsynchronized with a timing of a network. In one or many examples the wireless device may in a dormant mode not have a valid timing advance information with respect to the network. A dormant mode may be seen as a mode where the wireless device is unable to receive dedicated signaling. A dormant mode may be seen as a mode where closed loop power control is inactivated or suspended. Dormant mode may comprise RRC idle state, and/or RRC inactive state. For example, the wireless device may be in dormant mode when the connection with the network node has been released and/or suspended.

The figures are schematic and simplified for clarity, and they merely show details which aid understanding the disclosure, while other details have been left out. Throughout, the same reference numerals are used for identical or corresponding parts.

FIG. 1 is a diagram illustrating an example wireless communication system 1 comprising an example network node 400A and an example wireless device 300 according to this disclosure.

As discussed in detail herein, the present disclosure relates to a wireless communication system 1 comprising a cellular system, for example, a 3GPP wireless communication system. The wireless communication system 1 comprises a wireless device 300 and/or a network node 400A, 400B.

A network node disclosed herein refers to a radio network node, such as a radio access network node, operating in the radio access network, such as a base station, an evolved Node B, eNB, gNB in NR. In one or more examples, the RAN node is a functional unit which may be distributed in several physical units.

The network node 400A may be serving a first network of a first operator, and may be denoted as first network node. The network node 400B may be serving a second network of a second operator and may be denoted as second network node. In one or more examples, the network node is a functional unit which may be distributed in several physical units.

A core network, CN, node disclosed herein refers to a network node operating in the core network, such as in the Evolved Packet Core Network, EPC, and/or a 5G Core Network, 5GC. Examples of CN nodes in EPC include a Mobility Management Entity, MME.

The wireless communication system 1 described herein may comprise one or more wireless devices 300 and/or one or more network nodes 400A, 400B, such as one or more of: a radio network node, a base station, an eNB, a gNB and/or an access point. The wireless communication system 1 may comprise one or more CN nodes 600A, 600B.

A wireless device may refer to a mobile device and/or a user equipment, UE.

The wireless device 300 may be configured to communicate with the network node 400A, 400B via a wireless link (or radio access link) 10, 10A.

In one or more examples herein, the wireless device may be configured to communicate with the network node 400A, 400B using a first subscriber identity 300A via a first wireless link 10 and using a second subscriber identity 300B via a second wireless link 10A.

The first subscriber identity 300A and the second subscriber identity 300B may belong to the same operator or to different operators.

A subscriber identity may be implemented using a SIM, such as a Universal Subscriber Identity Module (USIM). The SIM may be a physical SIM and/or an embedded SIM, eSIM.

It is to be noted that there is a need for improving the support of multiple SIM communication. A single Rx wireless device or a single Tx wireless device is only capable today of having one connection at a time because the wireless device comprises only one transceiver that can receive and/or transmit in the same time slot using one connection or one SIM at a time. Single Rx allows a wireless device with multiple subscriber identities (such as Multi-USIM, MUSIM, UE) to receive traffic from only one network at one time. Dual Rx allows a wireless device with multiple subscriber identities (such as MUSIM UE) to simultaneously receive traffic from two networks. Single Tx allows a wireless device with multiple subscriber identities (such as MUSIM UE) to transmit traffic to one network at one time. Dual Tx allows a wireless device with multiple subscriber identities (such as MUSIM UE) to simultaneously transmit traffic to two networks. The terms Single Rx/Tx and Dual Rx/Tx do not refer to a device type. A single wireless device (such as UE) may, for example, uses Dual Tx in some cases but Single Tx in other cases.

For example, the wireless device using the first subscriber identity 300A is in connected state, such as in RRC connected state with the first network node 400A of operator A. For example, the wireless device using the second subscriber identity 300B is in connected state with the second network node 400B of operator B.

For example, the wireless device using the second subscriber identity 300B may be attempting to be in connected state with the second network node 400B of operator B. For example, the wireless device using the second subscriber identity 300B may be monitoring operator B in Idle state and may be being paged by operator B or may initiate a Mobile Originated, MO, service request. For example, the wireless device using the second subscriber identity 300B wants to connect to operator B, while remaining in connection with operator A.

Several approaches may be envisaged for the example with operator A and operator B. For example, one approach in legacy could be for operator A to suspend the wireless device using the first subscriber identity 300A to RRC inactive/Idle when connecting to operator B. For example, the wireless device using the first subscriber identity 300A is remaining in RRC connected state with operator A, but traffic is suspended from operator A. Another approach may be that the wireless device using the first subscriber identity 300A is remaining in RRC connected state with operator A, and continues traffic with operator A, while adding traffic flow with operator B, (for example, from different base stations). An additional approach is that operator A and operator B jointly coordinate the switching between Operator A and Operator B.

However, these approaches are not efficient in terms of signaling, power consumption, and/or delay.

The present disclosure provides example solutions allowing the wireless device to stay in RRC Connected state towards the two different networks, for each respective subscriber identity (for example, SIM), simultaneously, while being able to switch, such as toggle, between the two different connections with a limited time of interruption. The present disclosure permits alignment using Discontinuous Reception, DRX in connected state. In connected state, the wireless device can be using Connected state DRX functionality in order to save power, since being able to sleep for shorter periods during periods of inactivity or periods where no data is available for transmission. In one or more example methods of the present disclosure, Connected state DRX (C-DRX) schemes are coordinated to be non-overlapping, and the sleeping periods of DRX may be extended to allow for handling traffic from a second operator/network (such as operator B) while being in sleeping mode related to a first operator/network (such as operator A).

In one or more example solutions according to this disclosure, the wireless device may indicate to the network when the wireless device intends to release an ongoing connection with the network, or that the wireless is about to switch away from the given network. The wireless device may decide when to switch between the established connections, such as between the subscriber identities (SIMs). The one or more network nodes communicating with the wireless device may be aware of the switching scheme used by the wireless device, and may follow the proposal and/or request made by the wireless device. In other words, in one or more example methods disclosed herein, a switching between the established connections may be initiated by the wireless device, for example upon determining that a subscriber switch event has occurred.

The present disclosure provides a technique that is applicable to any UE architecture, such as one or more of: Single-Rx, Single-Tx, Dual-Rx, and Dual-Tx. It may be envisaged for example that network node 400A carries out New Radio, NR while network node 400B carries out Long Term Evolution, LTE, or NR. The present disclosure supports various types of systems for the network nodes disclosed herein, and Radio Access Technology, RAT, concurrency.

According to the current disclosure, the wireless device may have established connections, such as is in RRC connected state with more than one of a plurality of subscriber identities, but only communicates, such as has scheduled traffic, on one of the established connections. The established connections may be with different or with the same network operator. However, the network, such as the network node may not know that the two subscriber identities are from the same wireless device. The established connection with which the wireless device receives data and/or transmits data may be frequently changed between the first and the second established radio connection to support Quality of Service (QOS) requirements of services related to each of the established connections, such as to each of the subscriber identities.

According to the current disclosure, the wireless device may communicate with an operator/network using one established connection associated with one subscriber identity (such as a first SIM (herein referred to as SIM-A) and a second SIM (herein referred to as SIM-B) respectively) at a time. The other established connection is paused, for example by not scheduling data on the other established connection.

When the connection is paused and/or when the scheduling of data over the established radio connections are paused, the connections between the wireless device and the network node remain established, such that the connections are in sync and the wireless device has a UE context with the network. In other words, when the connections are paused and/or when the scheduling of data over the established radio connections are paused, the wireless device remains in RRC connected state towards the network with both subscriber identities, such as for both the established connections.

In one or more examples of the current disclosure, the method according to the current disclosure may be wireless device centric, which may also be referred to as being WD-centric. The method being WD-centric may herein be seen as the wireless device deciding when to switch between the established connections, such as between the subscriber identities (SIMs). However, the one or more network nodes communicating with the wireless device are aware of the solution, such as of a switching scheme used, and follows the decisions made by the wireless device. In other words, in one or more example methods disclosed herein, a switching between the established connections may be initiated by the wireless device. In one or more example methods, the wireless device may switch between the established connections if either a data buffer, such as a MAC buffer, is empty so there is no data to transmit and/or receive, or when the wireless device has received and/or transmitted data using one established connection for a configured maximum time. The maximum time may be indicated by an switching timer at the wireless device, and in the NW as described below. The switching timer may herein also be referred to as an internal WD switching timer. The switching timer may be a timer set by the wireless device for each of the established radio connections respectively which also may be sent to the network. The switching timer may define a maximum time for an active period that may be used for communication of data over the respective established radio connections. Upon expiry of the switching timer, the established connection may be paused. Expiry of the switching timer for an established radio connection may only be monitored, such as checked, when the established radio connection between the wireless device and the network node is used for communication. When the connection is paused the switching timer is not running and it is therefore not monitored when the established radio connection is paused.

Upon expiry of the switching timer, the established radio connection may be paused. However, the switching timer is only running when established radio connection is used for communication, hence the expiry of the switching timer for the first and/or second established radio connection may only be monitored, such as checked, when the established connection between the wireless device and the network node is actually used for communication and is not paused. In order to release the established connection, the wireless device may check whether a buffer is still empty and in that case whether the inactivity timer of DRX cycle of the established connection is expired. When the buffer is empty and the inactivity timer of the DRX cycle of the established connection is expired, the established connection may be released or suspended to RRC_Idle or RRC_Inactivity state.

The wireless device initiated switch between the established radio connections may be based on the following rules. The wireless device may start to communicate data with one of the operators and/or network nodes using one of the established connections, such as using the established radio connection for a first subscriber identity of the wireless device. When the wireless device is connected to one of the operators and/or network nodes and is to communicate data using one of the established radio connections, the wireless device may start a new switching timer for the subscriber identity of the established radio connection used for communication of data. The wireless device may download, such as receive, and/or upload, such as transmit, data between the wireless device and the network node using the established radio connection, such as data channel.

The wireless device may stop the communication of data when either a data buffer, such as a MAC data buffer (for Uplink (UL) and/or Downlink (DL)) is empty or the switching timer expires. The wireless device may send a "Pause Indication" and/or a pause time indicative of a time period during which the scheduling of data is to be paused to the Operator and/or Network node indicating that the operator/network node is to pause scheduling of data. The pause indication may for example be transmitted in the last data packet of the transmission before the pause starts.

When the change of the established radio connection and/or operator is due to the internal data buffers being empty, the data scheduling on the current established connection may be pauses and the wireless device may leave this established connection. However, the established connection may stay in connected state. The wireless device may switch to the next established radio connection, such as to the next subscriber identity.

When the switching timer expires before the data buffers are empty, the wireless device may pause communicating data on this established radio connection. The wireless device may indicate to and/or instruct the network node to pause data scheduling This may be indicated to the network node in the last UL data packet before the pause of the scheduling of data starts. The wireless device may then leave this established radio connection, but let the established connection stay in connected state.

The wireless device may then connect to the network node using the next subscriber identity, such as for a second subscriber identity, such as using the next established radio connection. The wireless device may resume data scheduling on this established radio connection by transmitting an indication to the network node that the network node can restart communication, such as start to schedule data (in UL and DL) again, for the second subscriber identity. The indication that the network node can start to schedule data again may be transmitted in a first UL data packet after the pause of the scheduling of data ends. Thereafter, the wireless device may start data reception and/or transmission using the established radio connection for the second subscriber identity.

In one or more example methods, the wireless device may start data reception and/or transmission using the established radio connection for the second subscriber identity after a pre agreed pause time has expired.

When returning to a subscriber identity, such as switching back to an established radio connection for the subscriber identity, after being connected using another subscriber identity, the wireless device may resume the download and/or upload session by transmitting an indication, such as an indication that the network node can start to schedule data again, in the first UL data packet after the pause of the scheduling of data ends.

When the data buffer is empty, then the network node may check an inactivity timer for release of the established radio connection (if inactivity timer is used). When the inactivity timer is used and has expired when the wireless device indicates that it wants to communicate using this subscriber identity again, the connection may be released and/or suspended by both the wireless device and the network node.

When the data buffer is empty and the inactivity timer is not expired, the wireless device may send a new indication indicating that data scheduling is to be paused in UL/DL. Both the wireless device and the network node may then halt the data scheduling. If inactivity timer is not started, start the inactivity timer.

When the buffers are not empty when returning to a subscriber identity and the inactivity timer is used and started, the wireless device may stop the inactivity timer. The wireless device may then continue with Download/Upload data using the established radio connection.

The RRC control of the connection may be used as normal during the active period of the established radio connection. The network node may release and/or suspend the wireless device to a dormant mode, such as to RRC_Idle state and/or RRC_Inactive state, at any time when the data scheduling is active (such as not paused) for the established radio connection and/or subscriber identity.

FIG. 2 shows a flow diagram of an example method 100, performed by a wireless device according to the disclosure, for simultaneous communication using a plurality of subscriber identities, such as using a plurality of Universal Subscriber Identity Module (USIM). Simultaneous communication may herein be seen as communication performed using simultaneous and/or parallel established radio connections. The established radio connections used for simultaneous communication may have toggled scheduling of data, such as non-overlapping scheduling of data. Simultaneous communication can be seen as a communication where a plurality of established connections are both in RRC connected mode in the same time period. The plurality of established connections can, over a time period, be used to communicate, while the data over the plurality of established connections is communicated in a toggled manner, so that the data communication over the established connections does not overlap at any time slot during the time period. Hence, all of the established connections are used for communicating in the time period (resulting in a simultaneous communication). However, during any given time slot of the time period only one of the plurality of established connections is used for communicating while the other established connections are not used, such as may be paused, for communication. During the simultaneous communication the established connections that are not used for communication in a time slot of the time period remain in connected state, such as in RRC connected mode. In other words, the wireless device may communicate simultaneously using a plurality of established radio connections by switching, such as toggling, between scheduling of data for the established radio connections so that data for the plurality of established radio connections is not scheduled at the same time, such as in overlapping time resources. The wireless device is the wireless device disclosed herein, such as wireless device 300 of FIG. 1, FIG. 6, FIG. 8 and FIG. 9.

In one or more example methods, the subscriber identities of the plurality of subscriber identities are different from each other, such as have different Subscriber identifications, such as different International Mobile Subscriber Identities (IMSI). In one or more example methods, the wireless device comprises a wireless interface with a radio transceiver comprising a single transmitter and/or a single receiver configured to communicate with the network node, wherein the radio transceiver is used for communicating using the first subscriber identity and the second subscriber identity.

The method 100 comprises establishing S102, with a first network node, a first radio connection associated with a first subscriber identity out of the plurality of subscriber identities. A radio connection being associated with a subscriber identity may herein be seen as the radio connection being established between the wireless device and the network node using the subscriber identity to set up a UE context with the network. The method 100 comprises establishing S104, with a second network node, a second radio connection associated with the second subscriber identity out of the plurality of subscriber identities. Establishing a connection may herein be seen as the wireless device performing an RRC connection setup for establishing a UE context with the network node. When the radio connection is established the wireless device is in RRC connected state towards the network node. In one or more example methods, the first network node and the second network node are the same network node. In one or more example methods the first network node and the second network node are different network nodes.

The method 100 comprises transmitting S106, to the first and/or the second network node, a control message indicating that the wireless device intends to communicate simultaneously using more than one of the plurality of subscriber identities. For example, if the plurality of subscriber identities comprises more than two subscriber identities, such as for example three subscriber identities, the wireless device may communicate using any pair out of these subscriber identities or all of the subscriber identities, such as all three of the subscriber identities. The control message indicating that the wireless device intends to communicate simultaneously using more than one of the plurality of subscriber identities may be transmitted via Radio Resource Control (RRC) signaling, such as in an assistance message from the wireless device, such as in a UE assistance message. The control message may indicate to the network node that the wireless device is a Multi-SIM device having more than one connections (operators) established, such as having one or more active connections, using more than one of the plurality of subscriber identities. The control message may in one or more example methods comprise an indication of the scheme used for switching between the established connections, such as whether a trigger based switching from the wireless device or a scheme based on non-overlapping DRX cycles for the established connections is used. In one or more example methods, the scheme used for switching may be explicitly signaled to the network node, e.g., by a flag in the RRC message indicating the switching scheme, and/or by transmitting a parameter associated with the switching scheme, such as an switching timer for the WD initiated switching scheme or an offset for a DRX cycle of one of the established radio connections for the non-overlapping C-DRX scheme.

In one or more example methods, the control message indicating that the wireless device intends to communicate simultaneously using the plurality of subscriber identities is transmitted S106 during establishing S102 of the first radio connection and/or during establishing S104 of the second radio connection. The control message indicating that the wireless device intends to communicate simultaneously using the plurality of subscriber identities informs the network node that the wireless device will now establish parallel radio connections, using at least two of the plurality of subscriber identities. Typically, this will affect the scheduler of the network node, such as of the base station. Hence, when receiving the indication in the control message, the network node can adapt its behavior to the parallel connections at the wireless device.

The method 100 comprises communicating S108, such as data and/or control signaling, over one of the first and the second established radio connections at a time. In other words, scheduling at the first and second connection will not occur in overlapping time periods. Stated differently, even if there are two established radio connections at each point in time only one will be used for scheduling. Hence, scheduling of data on one of the first and the second established radio connections is paused during time periods when the wireless device is communicating using the other established radio connection. In other words, when the wireless device is communicating over the first established radio connection, the wireless device may inform the second network node that scheduling of data on the second established radio connection shall be paused during the time period the wireless device is communicating with the first network node, such as over the first established radio connection. Correspondingly, when the wireless device is communicating over the second established radio connection, the wireless device may inform the first network node that scheduling of data on the first established radio connection shall be paused during the time period when the wireless device is communicating with the second network node, such as over the second established radio connection. The time periods when the wireless device is communicating using the established radio connections, may be referred to as the active periods of the established radio connections, such as the time periods given by the on-duration and/or by the inactivity timer of the DRX-cycle or by the switching timer of each established radio connection.

In one or more examples, the method 100 comprises informing S106A the network node about timings of switching between the first and the second established radio connections, such as a scheme used for switching between the established radio connections. In one or more example methods, the timings may comprise switching timers for the respective established radio connection. The switching timers may define a maximum time for an active period, such as an on-duration, of the respective established radio connections. The active period may herein be seen as a time period where the wireless device may be prepared and/or active and/or ready for transmitting and receiving over the established radio connection. In one or more example methods, the timings may comprise one or more of an offset of a DRX cycle, such as a C-DRX cycle, for one of the established radio connections, a length of an on-duration of the DRX-cycle, a starting time of an on-duration of the DRX-cycle, an end time of an on-duration of the DRX-cycle and a length of an inactivity timer of a DRX-cycle for one or more of the established radio connections.

In one or more example methods, the method comprises, upon determining that a subscriber switch event has occurred, switching S110 from communicating over the first established radio connection to communicating over the second established radio connection. In other words, the switching between the established radio connections may be initiated by the wireless device. In one or more example methods, the subscriber switch event comprises one or more of an expiry of an switching timer of one of the first and the second established radio connections, a data buffer associated with one of the first and the second established radio connections being empty. and an expiry of an inactivity timer, such as a DRX inactivity timer. In one or more example methods, the internal connectivity timer may correspond to the DRX inactivity timer. In one or more example methods, the internal connectivity timer may be different than the DRX inactivity timer. In one or more example methods, the subscriber switch event has a trigger-based schedule. The wireless device may determine that a subscriber switch event has occurred, such as an UL data buffer being empty or an switching timer expiring. The wireless device may send an explicit message, such as a trigger, to the network node informing about the switch. The trigger may instruct the network node to pause and/or restart scheduling of data on the established radio connection.

In one or more example methods, the wireless device may inform the network node(s) about the timings, such as when the switching occurs. The network node(s) may switch, such as pause and/or restart communication based on the timings. In this case, no explicit message, such as a trigger, from the wireless device may be required to perform the switch.

Figure 3:
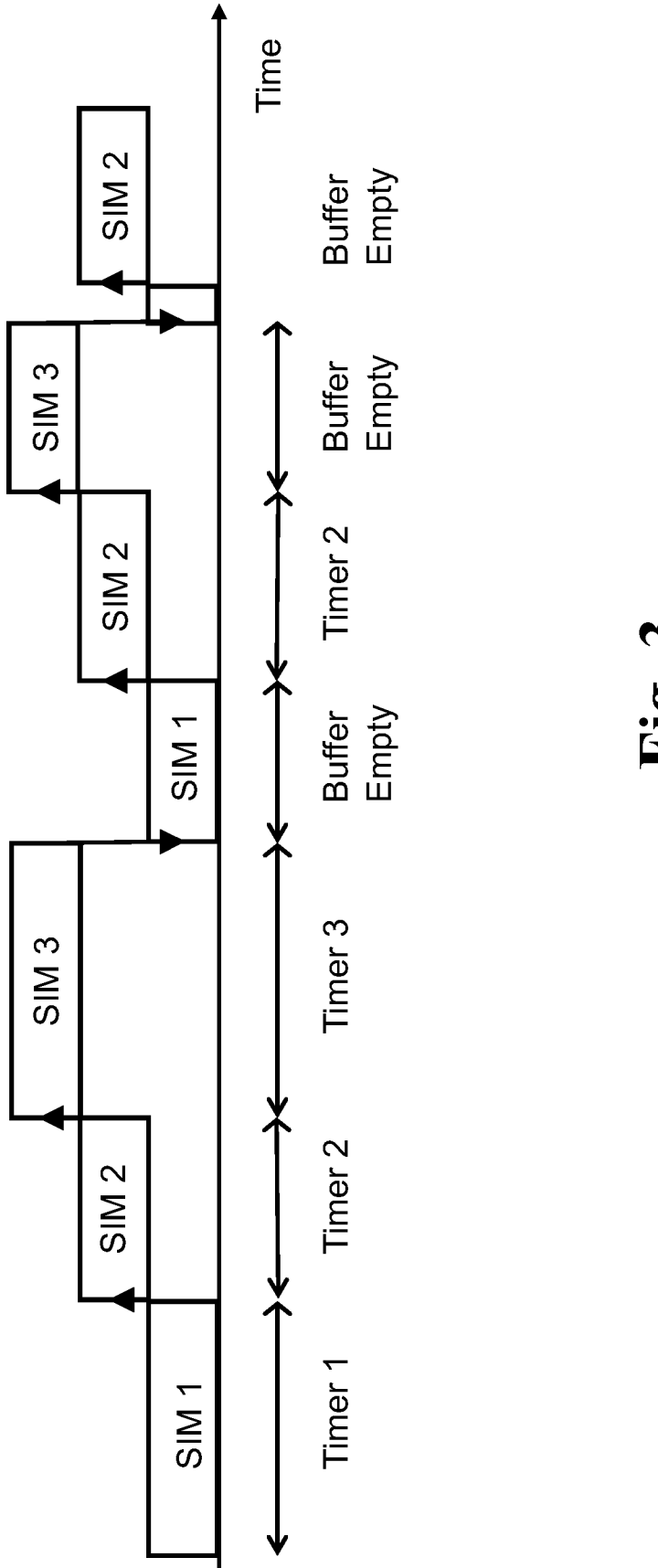
FIG. 3 is a diagram illustrating a WD initiated switching scheme for switching between established radio connections according to this disclosure.

FIG. 3 shows an example switching scheme initiated by the wireless device using switching timers. An active period, such as an on-duration, for each established radio connection for a subscriber identity, which is indicated as SIM1, SIM2 and SIM3 in FIG. 3, is time limited by an switching timer, Timer1, Timer2 and Timer3, respectively. The time until the next active period, when the wireless device leaves an operator, such as pauses communication using an established radio connection, is thereby less than or equal to the sum of the connection timers of the other subscriber identities. However, if a buffer becomes empty for any of the established radio connections, this may trigger a switch to the next established radio connection. The wireless device may switch, such as immediately switch, to the next established radio connection, such as to the next subscriber identity, as seen for the third time SIM1 is active in FIG. 3, even though the switching timer for SIM1 may not have expired. Thereby, the time until the next active period, such as for SIM2, may be reduced. It can also be seen in FIG. 3 that the SIM1 connection is released when the inactivity timer has expired.

The length of the switching timers may be configured based on a Quality of Service (QOS) of the services from each of the operators, such as the services on each established connection. The switching timers may be different for the different operators, such as for the different established connection, since one of the established connections may be more sensitive for long gaps etc. In case one service has low latency requirements, the length of the switching timers for the other operator(s), such as for the other established connections may be reduced to avoid long interruptions in the established connection having low latency.

In one or more example methods, switching S110 comprises transmitting S110A, to one of the first and the second network node, a message instructing the network node to pause scheduling data. Pausing scheduling data on one of the established radio connections enables communication on the other established radio connection with the other of the first and second network node. By instructing one of the network nodes to not schedule data on one of the established radio connections, such as on the established radio connection associated with the one of the network nodes, scheduling of data for both established radio connections simultaneously can be avoided. This allows the wireless device to use its transceiver for communicating on one of the established radio connections, without having to monitor for data on the other established radio connection. In other words, when, such as during time periods when, the wireless device is communicating with the first network node using the first established connection and is to switch to communicating using the second established connection, the wireless device may transmit the message instructing the network node to pause scheduling data to the first network node. Correspondingly, when the wireless device is communicating with the second network node using the second established connection and is to switch to communicating using the first established connection, the wireless device may transmit the message to the second network node instructing the network node to pause scheduling data. The message instructing the network node to pause scheduling data may comprise a pause indication indicating that the network node is to pause scheduling of data. In one or more examples the message instructing the network node to pause scheduling data may comprise a pause time. The pause time may indicate a time period during which the network node is to pause scheduling of data. The message instructing the network node to pause scheduling data and/or the pause indication may be transmitted to the network node in the last data packet transmitted before the pause of the scheduling of data starts. The message instructing the network node to pause scheduling data may in one or more examples comprise a Channel Status Information (CSI) report=0, such as a CSI report associated with the established radio connection. The CSI report being 0 may indicate to the network node that the wireless device is not able to receive data on the established radio connection. In other words, the pause indication may comprise a CSI report=0.

In one or more example methods, the message instructing the network node to pause scheduling data comprises a buffer status report, such as a buffer status report associated with a data buffer of the established radio connection currently communicated via. An empty buffer status report may indicate to the network node that there is no data to be transmitted over the established radio connection currently communicated via and/or that the wireless device is to switch to communicating over the other established radio connection.

In one or more example methods, the message instructing to the network node to pause scheduling data comprises a Medium Access Control (MAC) Control Element (CE) for reporting the buffer status report or Channel State Information (CSI) as defined in 3GPP TS 38.321, v16.4.0, section 6.1.3.

In one or more example methods, switching S110 comprises restarting S110B communication using the other established radio connection. In other words, when, such as during time periods when, the wireless device is communicating with the first network node using the first established connection and is to switch to communicating using the second established connection, the wireless device may restart the communication using the second established connection. Correspondingly, the wireless device is communicating with the second network node using the second established connection and is to switch to communicating using the first established connection, the wireless device may restart the communication using the first established connection.

During switching between the first and the second established radio connections, the switch may be performed by pausing scheduling of data on one of the established radio connections, while starting and/or restarting scheduling of data using the other established radio connection. Hence, switching 110 may comprise pausing scheduling of data on one of the established radio connections and restarting scheduling of data on another of the established data connections simultaneously or close in time.

In one or more example methods, restarting S110B communication comprises transmitting S110BA to the other of the first and the second network node a message instructing the network node to restart scheduling data. The other of the first and second network node may herein be seen as the network node out of the first and the second network node to which the wireless device wants to restart the communication. In other words, when the wireless device is communicating with the first network node using the first established connection and is to switch to communicating using the second established connection, the wireless device may transmit the message instructing the network node to restart scheduling data to the second network node. Correspondingly, the wireless device is communicating with the second network node using the second established connection and is to switch to communicating using the first established connection, the wireless device may transmit the message instructing the network node to restart scheduling data to the first network node. The message instructing the network node to restart scheduling data may be transmitted to the network node in a first UL packet transmitted after the pause of data scheduling on the established radio connection ends.

In one or more example methods, communicating S108 data over the second established data connection comprises pausing S108A communicating data over the first established radio connection. Correspondingly, communicating S108 data over the first established data connection comprises pausing S108A communicating data over the second established radio connection. In other words, when the wireless device communicates over one of the first and second established data connection it pauses the communication on the other established data connection.

In one or more example methods, the control message is indicative of one or more switching timers, such as connection timers internal to the wireless device, associated with the first established radio connection and/or the second established radio connection. Since the wireless device is the only device being aware of it having two subscriber identities sharing the same hardware, such as sharing a single transceiver of the wireless device, the wireless device may determine switching timers for its established connections. The switching timers may define the time slots for the established connections, during which time slots data may be scheduled on the established connections. The connection timers may be selected such that the time slots for scheduling data for the established connections, such as for the first and the second established connections, do not overlap with each other in time.

In one or more example methods, the control message comprises a request for a certain Discontinuous Reception (DRX) configuration for one of the first and the second established radio connections. The certain DRX configuration may be selected such that on-durations of the first and the second established radio connections do not overlap. In other words, certain DRX configuration may be selected such that sleep periods in the DRX cycles for the first established connection overlap in time with active periods in the DRX cycles for the second established connection. In one or more examples methods, in order for the wireless node to be in connected state using more than one subscriber identity, such as having more than one established connections, and communicating simultaneously with both of the subscriber identities, the wireless device may use Connected state DRX cycles (C-DRX), in a non-overlapping way, such that sleep periods in a DRX cycle associated with the first established connection is used for active periods in a DRX cycle associated with the second established connection. The active period may herein be seen as a time period during which data can be scheduled for the established connection. The active periods may herein be referred to as on-periods of the DRX-cycle. This has the benefit that the switching between the established connections may be performed based on a the DRX-configuration, such as a C-DRX configuration for the established radio connections. Since the wireless device is aware of, such as has information about, the DRX cycles, the wireless device may determine that a DRX-configuration for one of the established connections is to be modified, so that the DRX-cycles for the first and the second established connections do not overlap. The wireless device may thus send the request for a certain DRX-configuration satisfying that the DRX-cycles for the first and the second established connections do not overlap to the network node.

In one or more example methods, the request for the certain DRX configuration comprises information indicative of a modification of the DRX configuration for one of the first and the second established radio connections. The information indicative of the modification of the DRX configuration may be indicative of how the DRX-cycle is to be modified in order for the DRX-cycles of the established connections not to overlap. In one or more example methods, the information indicative of the modification of the DRX configuration comprises one or more of a desired frame offset, a desired on-duration period, a desired value of an DRX inactivity timer. In one or more example methods, the information may be indicative of a modification of a DRX periodicity. For example, if one of the subscriber identities is targeting lower traffic scenarios, such as background traffic, then the information may be indicative of an increased DRX period. In one or more example methods, the information may be indicative of a modification of an DRX inactivity timer of the DRX cycle and/or of the desired value of the DRX-cycle. In one or more example methods, the wireless device may restrict, such as reduce, an on-duration time for monitoring a Physical Downlink Control Channel (PDCCH) in Connected state DRX. The information indicative of the modification of the DRX configuration may in one or more examples be indicative of a start of an on-duration period of the DRX-cycle. The information indicative of the modification of the DRX configuration may be indicative of an ending of an on-duration period of the DRX-cycle. In one or more example methods, the wireless device may trigger an ending of the on-duration of the DRX-cycle. The information indicative of the modification of the DRX configuration may in one or more examples be indicative of a buffer status, that may be used for flow control and data rate regulation, such as in order to create time gaps for switching between subscriber identities, such as USIMs. For example, based on the buffer status, higher data rates in shorter burst may be applied. In one or more examples, the buffer status may be used for determining the on-duration time of the DRX cycle. If the buffer status is low or empty for a first established radio connection, the time of the on-duration for the DRX-cycle of that radio connection may be reduced, which allows the wireless device to pause communication on the first established radio connection, thereby allowing the second established radio connection to communicate data using the single receiver and/or transmitter.

In one or more example methods, the method comprises receiving S107, from the first and/or the second network node, information indicative of a DRX configuration, such as an updated DRX configuration, for one of the first and the second established radio connections. The information may be indicative of a modified DRX configuration corresponding to a modified DRX cycle for one of the first and the second established connection that does not overlap with the DRX cycle of the other established connection.

Figure 4:
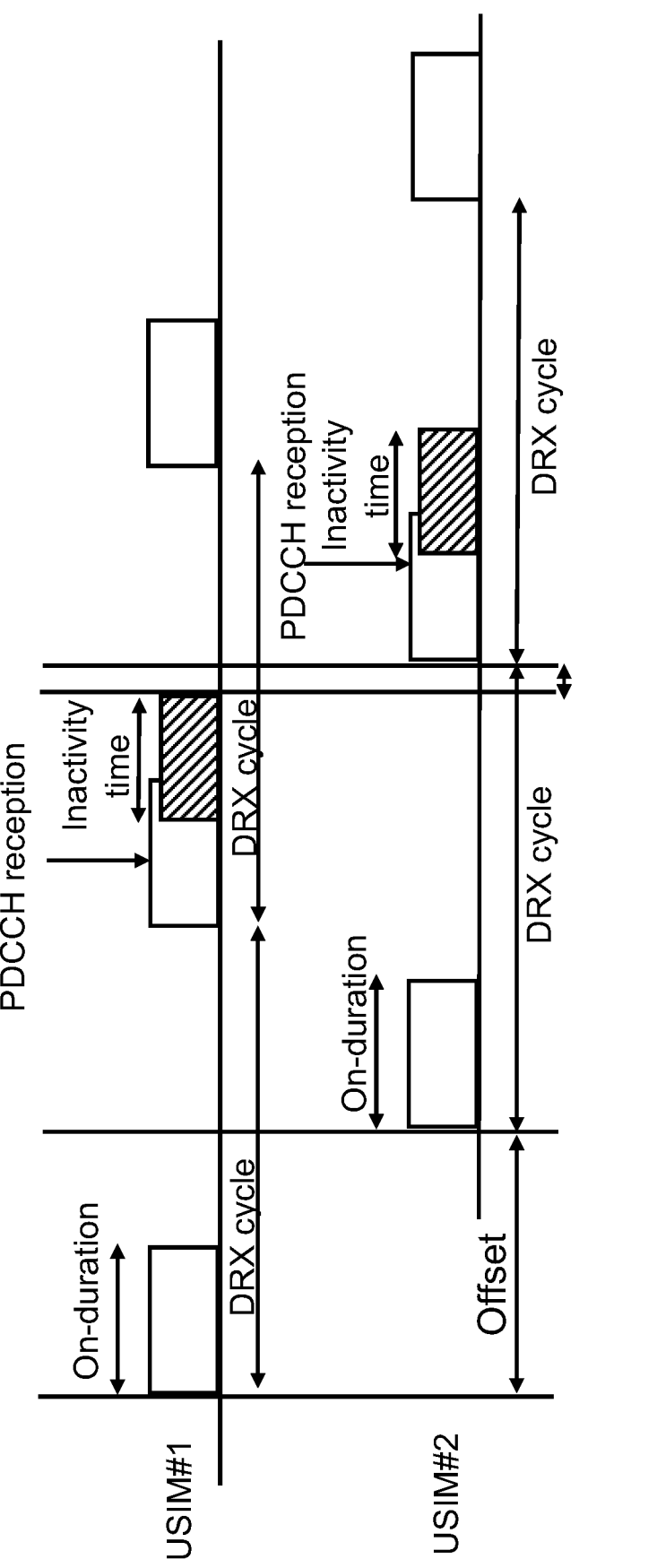
FIG. 4 is a diagram illustrating a switching scheme for switching between established radio connections based on non-overlapping DRX-cycles according to this disclosure.

FIG. 4 shows an example method where one of the DRX-cycles for the first and the second established radio connections have been modified. In the case of C-DRX a DRX event is defined where the receiving wireless device monitors a Physical Downlink Control Channel (PDCCH) for DownLink (DL) data from the network node during an on-duration of the DRX cycle. When there is no DL data in a buffer, such as in a MAC buffer, the wireless device may go to sleep, such as may enter an RRC Idle state in which the wireless device may turn of its transceiver to save energy. When there is data in the buffer the wireless device may start to receive and/or transmit data. When the data has been received and/or transmitted and the buffers are empty, the wireless device and/or the network node may wait for the DRX inactivity time before it suspends the connection and goes to sleep until the next time it is scheduled for a PDCCH monitoring event, such as during the next on-duration. In FIG. 4, the DRX-cycle for the first established connection is indicated in FIG. 4 by USIM #1 while the DRX-cycle for the second established connection is indicated in FIG. 4 by USIM #2. According to the current disclosure one of the DRX-cycles for the first and second established connection may be modified by introducing an offset, such as a time and/or frame offset, between the start of the DRX-cycle for the first established connection USIM #1 and the start of the DRX-cycle for the second established connection USIM #2, as shown in FIG. 4. The offset may be determined by the wireless device and may be sent to the network node, such as in the request for the certain DRX-configuration. The offset may be determined such that an inactivity timer of USIM #1 has expired prior to the on-duration of USIM #2 and/or the on-duration of USIM #1 to be finished before the on-duration of USIM #2 starts. The wireless device may in one or more example methods determine the offset such that a minimum switch time is provided between the finishing of the on-duration and/or the expiry of the inactivity timer of the DRX-cycle for USIM #1 before the on-duration of the DRX-cycle for USIM #2 starts. As can be seen in FIG. 4, once one of the DRX-cycles has been modified, the DRX cycles, such as C-DRX cycles, for the first and second established connections, may have different timing so that the wireless device can receive data during the respective C-DRX periods of each established connection. As can be seen, USIM #1 (the first established connection) has its DRX occasions, such as on-duration and inactivity time, scheduled between two of the DRX occasions of USIM #2 (second established connection). This allows the wireless device to be in simultaneous connection with the first and the second network node using the first and second subscriber identity respectively, using a single transmitter and/or receiver.

Figure 5B:
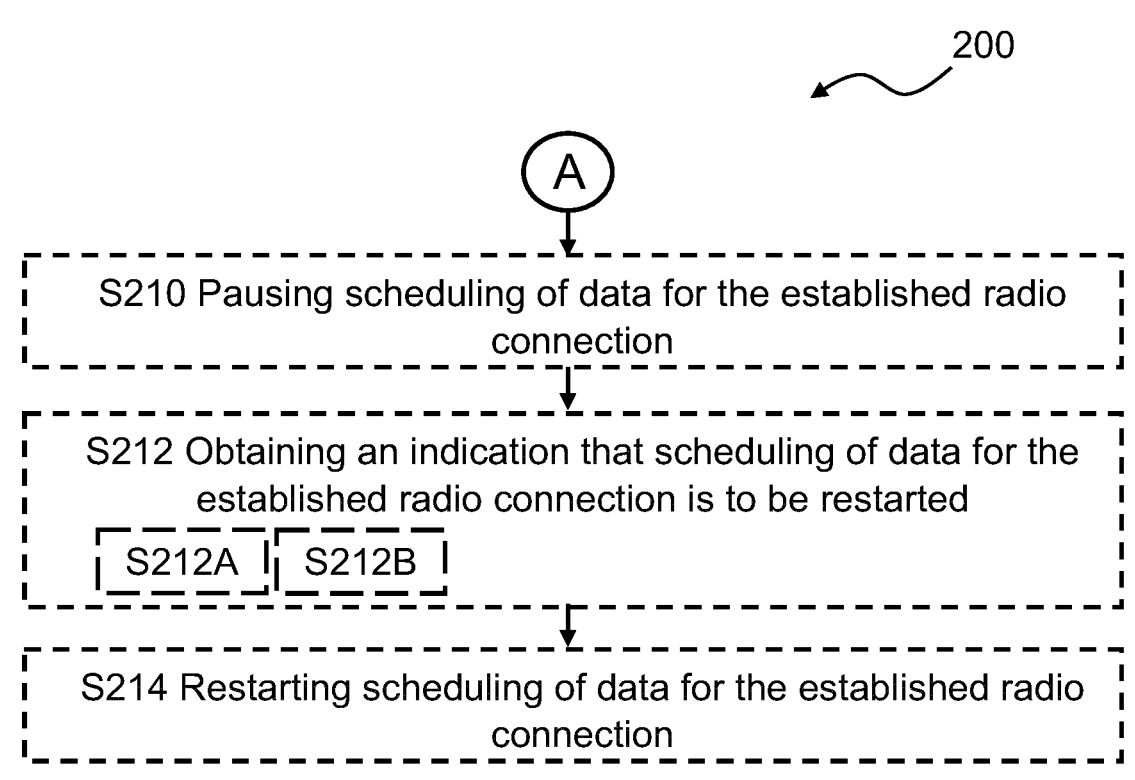

FIGS. 5A and 5B show a flow diagram of an example method 200, performed in a network node, such as in a radio network node, for enabling communication with a wireless device using a plurality of subscriber identities according to the disclosure. The method 200 may be performed by a network node disclosed herein, such as network node 400A, 400B of FIGS. 1, 7, 8 and 9.

The method 200 comprises establishing S202 a radio connection, such as a first radio connection, to the wireless device. The radio connection may be associated with a first subscriber identity out of the plurality of subscriber identities of the wireless device. The step S202 corresponds for the network node corresponds to step S102 and/or S104 for the wireless device as discussed in relation to FIG. 2.

The method 200 comprises receiving S204, from the wireless device, a control message indicating that the wireless device intends to communicate simultaneously using more than one of the plurality of subscriber identities. The control message may indicate to the network node, that the wireless device intends to communicate simultaneously using a plurality of established radio connections associated with a respective subscriber identity of the wireless device. The step S204 for the network node corresponds to step S106 for the wireless device as discussed in relation to FIG. 2.

In one or more example methods, the control message is indicative of one or more switching timers associated with the established radio connection. The switching timer may be indicative of an active period, such as an on-duration, of the established radio connection.

In one or more example methods, the control message received from the wireless device comprises a request for a certain Discontinuous Reception, DRX, configuration for the established radio connection. In one or more example methods, the request for the updated DRX configuration comprises information indicative of a change, such as a modification, of the DRX configuration. In one or more example methods, the information indicative of the change of the DRX configuration comprises one or more of a frame offset, an on-duration and a value of an inactivity timer. The information indicative of the modification of the DRX configuration may be indicative of how the DRX-cycle is to be modified in order for the DRX-cycles of the established connections not to overlap. In one or more example methods, the information indicative of the modification of the DRX configuration comprises one or more of a desired frame offset, a desired on-duration period, a desired value of an inactivity timer. In one or more example methods, the information may be indicative of a modification of a DRX periodicity. For example, if one of the subscriber identities is targeting lower traffic scenarios, such as background traffic, then the information may be indicative of an increased DRX period. In one or more example methods, the information may be indicative of a modification of an inactivity timer of the DRX cycle and/or of the desired value of the DRX-cycle. In one or more example methods, the wireless device may restrict, such as reduce, an on-duration time for monitoring a Physical Downlink Control Channel (PDCCH) in Connected state DRX. The information indicative of the modification of the DRX configuration may in one or more examples be indicative of a start of an on-duration period of the DRX-cycle. The information indicative of the modification of the DRX configuration may be indicative of an ending of an on-duration period of the DRX-cycle. In one or more example methods, the wireless device may trigger an ending of the on-duration of the DRX-cycle.

The method 200 comprises communicating S207 with the wireless device over the established radio connection. The network node may for example communicate data or control signaling with the wireless device over the established radio connection. Scheduling of data at one of the first and the second established radio connections may be paused during time periods when the wireless device indicates that it is communicating using another subscriber identity, such as using an established radio connection associated with another subscriber identity. The step S207 for the network node corresponds to step S108 for the wireless device as discussed in relation to FIG. 2.

In one or more example methods, the method 200 comprises receiving S204A, from the wireless device, information about timings of switching between a first and a second established radio connection. In one or more example methods, the timings may comprise switching timers for the respective established radio connection. The switching timers may define a maximum time for an active period, such as an on-duration, of the respective established radio connections. In one or more example methods, the timings may comprise one or more of an offset of a DRX cycle, such as a C-DRX cycle, for one of the established radio connections, a length of an on-duration of the DRX-cycle, a starting time of an on-duration of the DRX-cycle, an end time of an on-duration of the DRX-cycle and a length of an inactivity timer of a DRX-cycle for one or more of the established radio connections. The step S204A for the network node corresponds to step S106A for the wireless device, as discussed in relation to FIG. 2.

In one or more examples the method may comprise scheduling S207A data based on the received information, such as the information about timings of switching between a first and a second established radio connection.

In one or more example methods, the method 200 comprises determining S205 an updated DRX configuration for the established radio connection based on the received request.

In one or more example methods, the method 200 comprises transmitting S206, to the wireless device, information indicative of an updated DRX configuration for the established radio connection. The information may be indicative of a modified DRX configuration corresponding to a modified DRX cycle for one of the first and the second established connection that does not overlap with the DRX cycle of the other established connection. Step S206 of FIG. 5A is similar to step S107 discussed in relation to FIG. 2.

In one or more example methods, the method 200 comprises obtaining S208 an indication that scheduling of data for the established radio connection is to be paused. The step S208 is similar to step S110, as discussed in relation to FIG. 2.

In one or more example methods, obtaining S208 an indication that scheduling of data is to be paused comprises receiving S208A, from the wireless device, a message instructing the network node to pause scheduling of data for the established radio connection. The step S208A is similar to step S110A, as discussed in relation to FIG. 2.

In one or more example methods, the message instructing the network node to pause scheduling of data for the established radio connection comprises a buffer status report, such as a buffer status report associated with a data buffer of the established radio connection currently communicated via. An empty buffer status report may indicate to the network node that there is no data to be transmitted over the established radio connection currently communicated via and/or that the wireless device is to switch to communicating over the other established radio connection.

In one or more example methods, obtaining S208 an indication that scheduling of data is to be paused comprises determining S208B that an inactivity timer for the established radio connection has expired. When the established radio connections use, such as are configured with, non-overlapping DRX-cycles, the network node may determine that the scheduling of data is to be paused for an established radio connection when an inactivity timer of the DRX-cycle expires. The expiry of the inactivity timer may thus be an indication to the network node to pause the scheduling of data. In this case, the wireless device does not have to instruct the network node to pause the scheduling of data for the established radio connection between the network node and the wireless device, since the network node is aware of the DRX-cycle for its established radio connections. This has the benefit that the signaling overhead related to a switching between the established radio connections can be reduced.

In one or more example methods, the message instructing the network node to pause scheduling data comprises a buffer status report, such as a buffer status report associated with a data buffer of the established radio connection currently communicated via. An empty buffer status report may indicate to the network node that there is no data to be transmitted over the established radio connection currently communicated via and/or that the wireless device is to switch to communicating over the other established radio connection. In one or more example methods, the message instructing to the network node to pause scheduling data comprises a Medium Access Control Control Element, MAC CE.

In one or more example methods, obtaining S208 an indication that scheduling of data is to be paused comprises determining S208C that a data buffer for the established radio connection is empty. Step S208 of FIG. 5A is similar to step S110 discussed in relation to FIG. 2.

In one or more example methods, the method 200 comprises pausing S210 scheduling of data for the established radio connection. The scheduling of data may be paused based on the obtained indication that scheduling is to be paused.

In one or more example methods, the method 200 comprises obtaining S212 an indication that scheduling of data for the established radio connection is to be restarted. Step S212 of FIG. 5B is similar to step S110 discussed in relation to FIG. 2.

In one or more example methods, obtaining S212 an indication that scheduling of data for the established radio connection is to be restarted comprises receiving S212A, from the wireless device, a message instructing the network node to restart scheduling of data for the established radio connection. Step S212A of FIG. 5B is similar to step S110 discussed in relation to FIG. 2.

In one or more example methods, obtaining S212 an indication that scheduling of data for the established radio connection is to be restarted comprises determining S212B that an on-duration is scheduled for the established radio connection. When the non-overlapping DRX-cycle scheme is used, the network node may restart the scheduling of data during the on-duration of the DRX-cycle for the established data connection.

In one or more example methods, the method 200 comprises restarting S214 scheduling of data for the established radio connection, for example based on the obtained indication that scheduling of data is to be restarted for the established radio connection.

Figure 6:
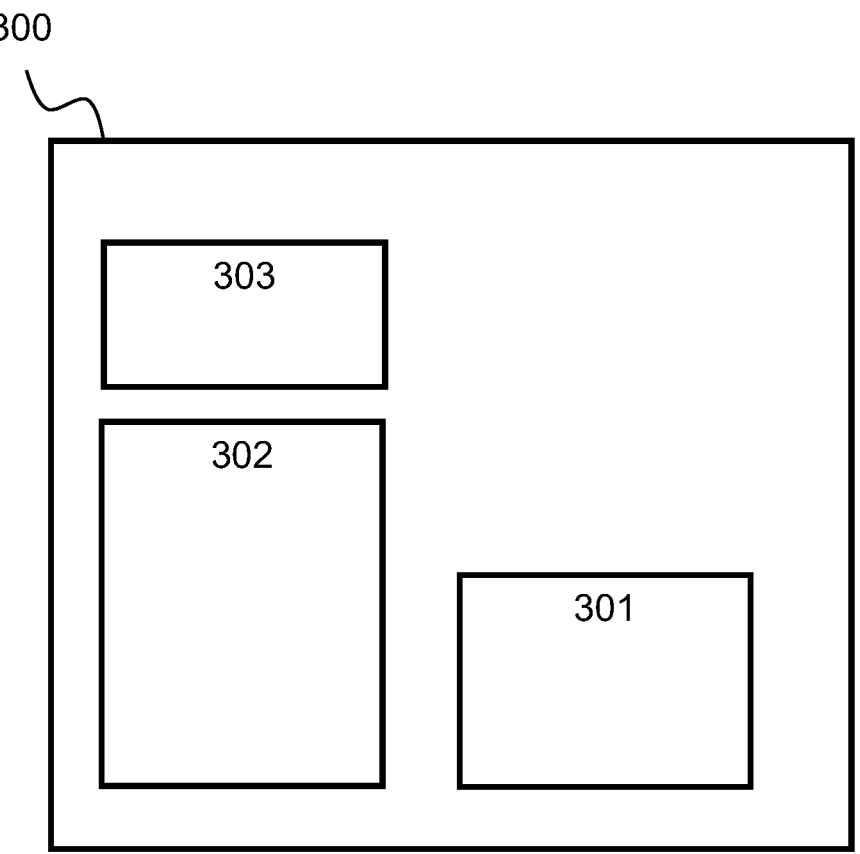
FIG. 6 is a block diagram illustrating an example wireless device according to this disclosure.

FIG. 6 shows a block diagram of an example wireless device 300 according to the disclosure. The wireless device 300 comprises memory circuitry 301, processor circuitry 302, and a wireless interface 303. The wireless device 300 may be configured to perform any of the methods disclosed in FIG. 2. In other words, the wireless device 300 may be configured for simultaneous communication using a plurality of subscriber identities.

The wireless device 300 is configured to establish, with a first network node, a first radio connection associated with a first subscriber identity out of the plurality of subscriber identities.

The wireless device 300 is configured to establish, with a second network node, a second radio connection associated with the second subscriber identity out of the plurality of subscriber identities.

The wireless device 300 is configured to transmit, via the wireless interface (such as via the wireless interface 303), to the first and/or the second network node, a control message indicating that the wireless device intends to communicate simultaneously using more than one of the plurality of subscriber identities.

The wireless device 300 is configured to communicate, via the wireless interface (such as via the wireless interface 303), over one of the first and the second established radio connections at a time.

In one or more example wireless devices, scheduling of data on one of the first and the second established radio connections is paused during time periods when the wireless device is communicating using the other established radio connection.

The wireless interface 303 is configured for wireless communications via a wireless communication system, such as a 3GPP system, such as a 3GPP system supporting one or more of: New Radio, NR, Narrow-band IoT, NB-IOT, and Long Term Evolution-enhanced Machine Type Communication, LTE-M.

The wireless device 300 is optionally configured to perform any of the operations disclosed in FIG. 2 (such as any one or more of S106A, S107, S108A, S110, S110A, S110B, S110BA). The operations of the wireless device 300 may be embodied in the form of executable logic routines (for example, lines of code, software programs, etc.) that are stored on a non-transitory computer readable medium (for example, memory circuitry 301) and are executed by processor circuitry 302).

Furthermore, the operations of the wireless device 300 may be considered a method that the wireless device 300 is configured to carry out. Also, while the described functions and operations may be implemented in software, such functionality may also be carried out via dedicated hardware or firmware, or some combination of hardware, firmware and/or software.

Memory circuitry 301 may be one or more of a buffer, a flash memory, a hard drive, a removable media, a volatile memory, a non-volatile memory, a random access memory (RAM), or other suitable device. In a typical arrangement, memory circuitry 301 may include a non-volatile memory for long term data storage and a volatile memory that functions as system memory for processor circuitry 302. Memory circuitry 301 may exchange data with processor circuitry 302 over a data bus. Control lines and an address bus between memory circuitry 301 and processor circuitry 302 also may be present (not shown in FIG. 6). Memory circuitry 301 is considered a non-transitory computer readable medium.

Memory circuitry 301 may be configured to store information such as plurality of subscriber identities, in a part of the memory.

Figure 7:
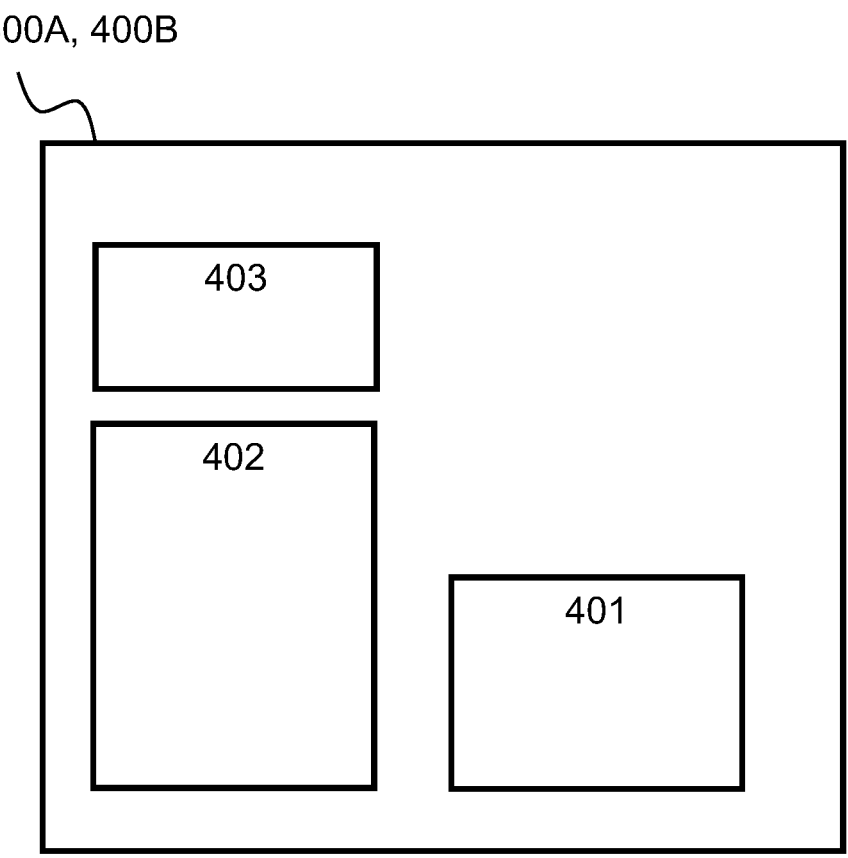
FIG. 7 is a block diagram illustrating an example network node according to this disclosure.

FIG. 7 shows a block diagram of an example network node 400, 400A according to the disclosure. The network node 400 comprises memory circuitry 401, processor circuitry 402, and a wireless interface 403. The network node 400 may be configured to perform any of the methods disclosed in FIG. 5A-5B. In other words, the network node 400, 400A may be configured for enabling communication with a wireless device using a plurality of subscriber identities.

The network node 400 is configured to establish a radio connection to the wireless device. In one or more example network nodes, the first radio connection is associated with a first subscriber identity out of the plurality of subscriber identities.

The network node 400 is configured to receive (such as using the wireless interface 403), from the wireless device, a control message indicating that the wireless device intends to communicate simultaneously using more than one of the plurality of subscriber identities.

The network node 400 is configured to communicate (such as using the wireless interface 403), with the wireless device over the established radio connection.

In one or more example network nodes, scheduling (such as by using the processor circuitry 402) of data at one of the first and the second established radio connections is paused during time periods when the wireless device indicates that it is communicating using another subscriber identity.

The wireless interface 403 is configured for wireless communications via a wireless communication system, such as a 3GPP system, such as a 3GPP system supporting one or more of: New Radio, NR, Narrow-band IoT, NB-IOT, and Long Term Evolution-enhanced Machine Type Communication, LTE-M.

Processor circuitry 402 is optionally configured to perform any of the operations disclosed in FIG. 5A-5B (such as any one or more of S204A, S205, S206, S207A, S208, S208A, S208B, S208C, S210, S212, S212A, S212B, S214). The operations of the network node 400 may be embodied in the form of executable logic routines (for example, lines of code, software programs, etc.) that are stored on a non-transitory computer readable medium (for example, memory circuitry 401) and are executed by processor circuitry 402).

Furthermore, the operations of the network node 400 may be considered a method that the network node 400 is configured to carry out. Also, while the described functions and operations may be implemented in software, such functionality may also be carried out via dedicated hardware or firmware, or some combination of hardware, firmware and/or software.

Memory circuitry 401 may be one or more of a buffer, a flash memory, a hard drive, a removable media, a volatile memory, a non-volatile memory, a random access memory (RAM), or other suitable device. In a typical arrangement, memory circuitry 401 may include a non-volatile memory for long term data storage and a volatile memory that functions as system memory for processor circuitry 402. Memory circuitry 401 may exchange data with processor circuitry 402 over a data bus. Control lines and an address bus between memory circuitry 401 and processor circuitry 402 also may be present (not shown in FIG. 7). Memory circuitry 401 is considered a non-transitory computer readable medium.

Memory circuitry 401 may be configured to store scheduling data in a part of the memory.

Figure 8:
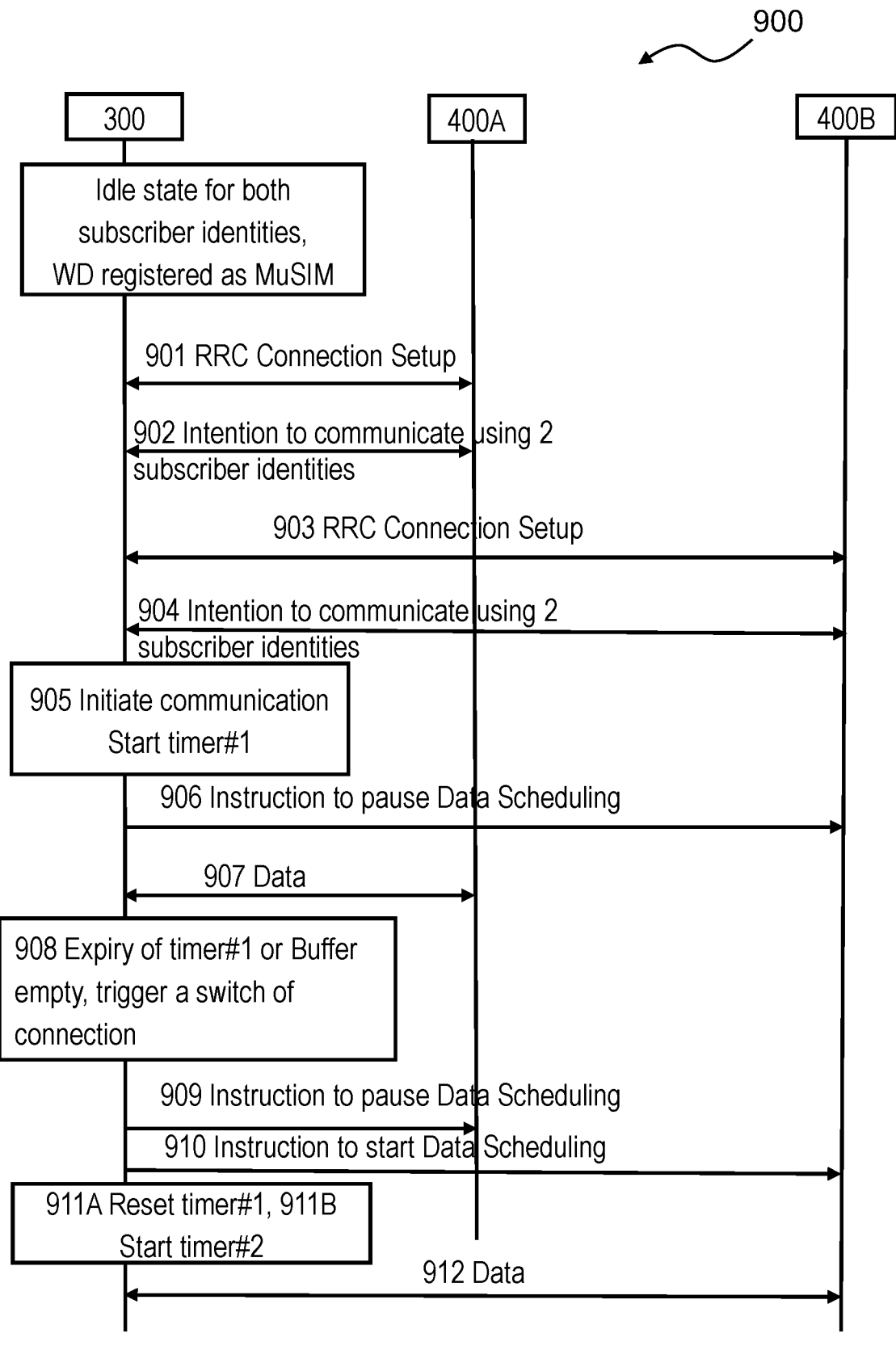
FIG. 8 is a signaling diagram illustrating an example message exchange between an example wireless device and a first network node and a second network node for a switching scheme initiated by the wireless device according to this disclosure.

FIG. 8 discloses a signaling diagram illustrating an example message exchange 900 between an example wireless device 300 and a first network node 400A and a second network node 400B for a switching scheme initiated by the wireless device according to this disclosure. The wireless device 300 comprises a wireless interface with a radio transceiver comprising a single transmitter and/or a single receiver configured to communicate with the first network node 400A and the second network node 400B, wherein the radio transceiver is used for communicating with the first network node 400A using the first subscriber identity and with the second network node 400B using the second subscriber identity. The wireless device may be in a dormant mode, such as in RRC Idle state, towards a network with the first and/or second subscriber identity. The wireless device may be registered as a device having a plurality of subscriber identities, such as a MultiSIM or MuSIM device.

The WD 300 performs an RRC connection setup 901 with the first network node 400A for the first subscriber identity and enters RRC Connected state with the first subscriber identity. The WD 300 thereby establishes a radio connection with the network node 400A. This corresponds to step S102 of the method disclosed in FIG. 2 and step S202 of the method disclosed in FIG. 5A.

The WD 300 transmits a control message 902 indicating that the wireless device intends to communicate simultaneously using more than one of the plurality of subscriber identities, such as using two subscriber identities, to the first network node 400A. The control message may comprise information about switching schemes, such as schedules and/or timers, for communicating simultaneously using the more than one subscriber identities. This is similar to step S106 and S106A of the method disclosed in FIG. 2 and step S204 and S204A of the method disclosed in FIG. 5A.

The WD 300 performs an RRC connection setup 903 with the second network node 400B for the second subscriber identity and enters RRC Connected state with the second subscriber identity. The WD 300 thereby establishes a radio connection with the network node 400B. This corresponds to step S104 of the method disclosed in FIG. 2 and is similar to step S202 of the method disclosed in FIG. 5A.

The WD 300 transmits a control message 904 indicating that the wireless device intends to communicate simultaneously using more than one of the plurality of subscriber identities, such as using two subscriber identities, to the second network node 400B. The control message may comprise information about switching schemes, such as schedules and/or timers, for communicating simultaneously using the more than one subscriber identities. This is similar to step S106 and S106A of the method disclosed in FIG. 2 and similar to step S204 and S204A of the method disclosed in FIG. 5A.

Once the WD 300 has established connections with the first network node 400A and the second network node 400B, the WD 300 initiates communication 905 with one of the first and the second network nodes 400A, 400B at a time. The WD may have ongoing communication or may start communicating data over the first established connection with the first network node 400A. When the WD 300 starts communicating over the first established radio connection the WD 300 may start an switching timer (timer #1) for the first established connection with the first network node 400A. This is similar to S108 of the method disclosed in FIG. 2 and step S207 of the method disclosed in FIG. 5A.

Upon starting communication over the first established connection with the first network node 400A, the WD 300 may transmit an instruction 906, to the second network node 400B, to pause scheduling of data or a preferred scheme on when it wants scheduling of data over the second established connection to be paused. This corresponds to S110A of the method disclosed in FIG. 2 and step S208A of the method disclosed in FIG. 5A.

The WD 300 communicates data 907 with, such as to/from, the network node 400A over the first established radio connection. This is similar to S108 of the method disclosed in FIG. 2 and step S207 of the method disclosed in FIG. 5A.

When a subscriber switch event occurs, such as upon expiry of the switching timer for the first established radio connection (timer #1) or when a buffer, such as a data buffer, for the first established radio connection is empty, the WD 300 initiates a switch from the first established radio connection with the first network node 400A to the second established radio connection with the second network node 400B. This is similar to S110 of the method disclosed in FIG. 2.

In order to switch from communicating between the first established radio connection with the first network node 400A to the second established radio connection with the second network node 400B, the WD 300 transmits an instruction 909 to pause scheduling of data over the first established radio connection to the first network node 400A. This corresponds to S110A of the method disclosed in FIG. 2 and step S208A of the method disclosed in FIG. 5A.

The WD 300 further transmits an instruction 910 to start and/or restart scheduling of data over the second established radio connection to the second network node 400B. This corresponds to S110B of the method disclosed in FIG. 2 and step S212, S212A of the method disclosed in FIG. 5A.

When the scheduling of data over the first established radio connection with the first network node 400A has been paused and the scheduling of data over the second established radio connection with the second network node 400B has been started/restarted, the WD 300 may start 911B the switching timer (timer #2) for the second established radio connection and reset 911A the internal connection timer (timer #1) for the first established radio connection.

The WD 300 communicates data 907 with, such as to/from, the network node 400A over the first established radio connection. This is similar to S108 of the method disclosed in FIG. 2 and step S207 of the method disclosed in FIG. 5A.

The WD 300 proceeds with communicating data 912 with, such as to/from, the network node 400B over the second established radio connection. This is similar to S108 of the method disclosed in FIG. 2 and step S207 of the method disclosed in FIG. 5A.

When a subscriber switch event occurs, such as upon expiry of the switching timer for the second established radio connection (timer #2) or when a buffer, such as a data buffer, for the second established radio connection is empty, the WD 300 initiates a switch from the second established radio connection with the second network node 400B back to the first established radio connection with the first network node 400A, in a similar way as the performed in 908, 909, 910, 911A and 911B. This is similar to S110 of the method disclosed in FIG. 2.

The WD 300 then proceeds to switch back and forth between the first and the second established radio connections until for example an inactivity timer, such as a DRX inactivity timer expires for one of the established radio connections. In other words, the WD 300 may repeat 908, 909, 910, 911A and 911B in order to switch back and forth between the established radio connections.

Figure 9:
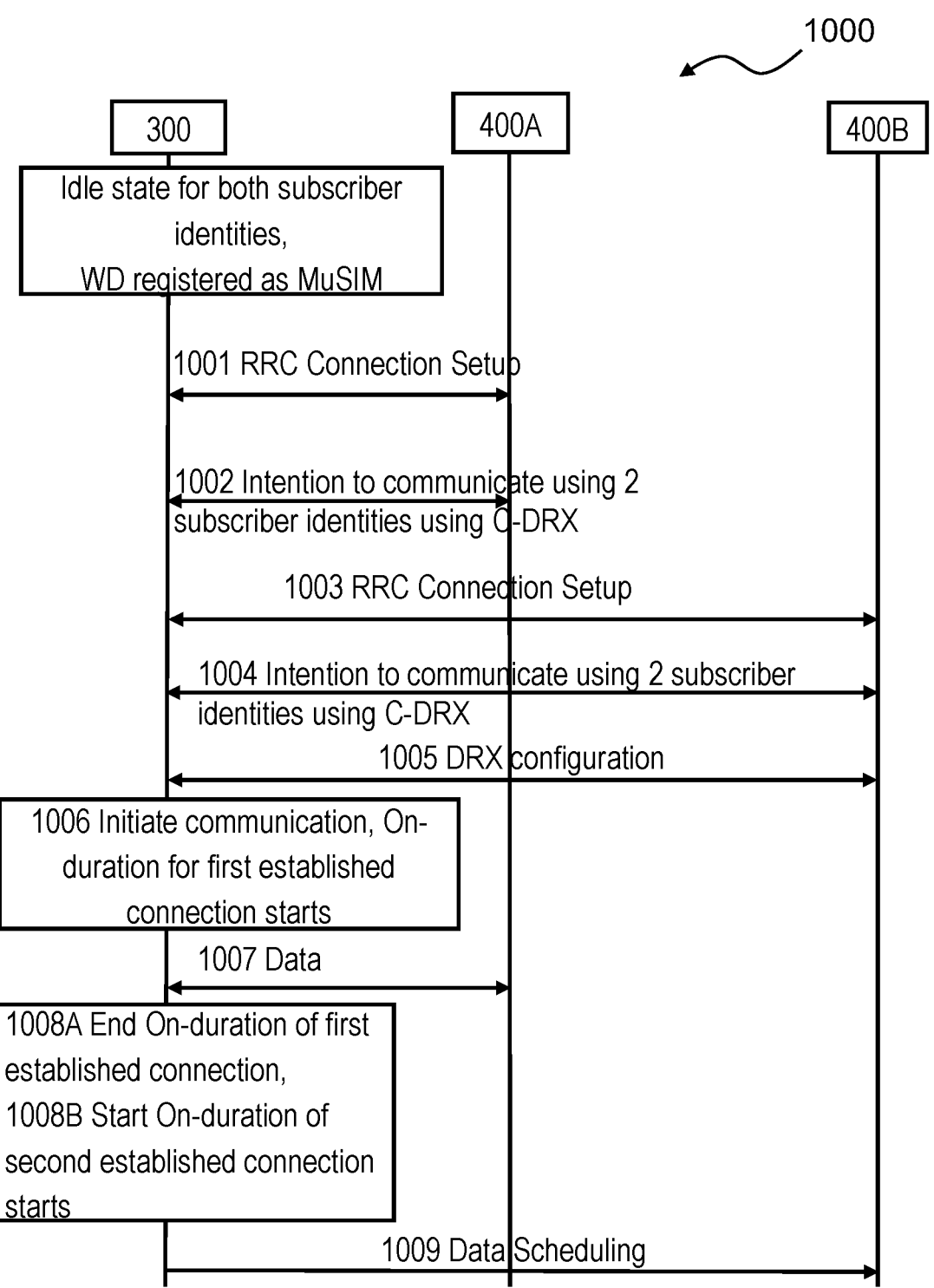
FIG. 9 is a signaling diagram illustrating an example message exchange between an example wireless device and a first network node and a second network node for a switching scheme based on non-overlapping DRX-cycles according to this disclosure.

FIG. 9 discloses a signaling diagram illustrating an example message exchange 1000 between an example wireless device 300 and a first network node 400A and a second network node 400B for a switching scheme based on non-overlapping DRX-cycles according to this disclosure. The wireless device 300 comprises a wireless interface with a radio transceiver comprising a single transmitter and/or a single receiver configured to communicate with the first network node 400A and the second network node 400B, wherein the radio transceiver is used for communicating with the first network node 400A using the first subscriber identity and with the second network node 400B using the second subscriber identity. The wireless device may be in a dormant mode, such as in RRC Idle state, towards a network with the first and/or second subscriber identity. The wireless device may be registered as a device having a plurality of subscriber identities, such as a MultiSIM or MuSIM device.

The WD 300 performs an RRC connection setup 1001 with the first network node 400A for the first subscriber identity and enters RRC Connected state with the first subscriber identity. The WD 300 thereby establishes a radio connection with the network node 400A. This corresponds to step S102 of the method disclosed in FIG. 2 and step S202 of the method disclosed in FIG. 5A.

The WD 300 transmits a control message 1002 indicating that the wireless device intends to communicate simultaneously using more than one of the plurality of subscriber identities, such as using two subscriber identities, to the first network node 400A. The control message may comprise information about the switching schemes for communicating using the more than one subscriber identities. According to the example methods disclosed in FIG. 9. The control message may comprise information indicating that the wireless device 300 intends to communicate using the more than one subscriber identities using a DRX based switching scheme, such as a C-DRX based switching scheme, such as using a switching scheme based on non-overlapping DRX-cycles. This is similar to step S106 and S106A of the method disclosed in FIG. 2 and step S204 and S204A relating to the DRX-cycle of the method disclosed in FIG. 5A.

The WD 300 performs an RRC connection setup 1003 with the second network node 400B for the second subscriber identity and enters RRC Connected state with the second subscriber identity. The WD 300 thereby establishes a radio connection with the network node 400B. This corresponds to step S104 of the method disclosed in FIG. 2 and is similar to step S202 of the method disclosed in FIG. 5A.

The WD 300 transmits a control message 1004 indicating that the wireless device intends to communicate simultaneously using more than one of the plurality of subscriber identities, such as using two subscriber identities, to the second network node 400B. The control message may comprise information about the switching schemes for communicating using the more than one subscriber identities. According to the example methods disclosed in FIG. 9. The control message may comprise information indicating that the wireless device 300 intends to communicate using the more than one subscriber identities using a DRX based switching scheme, such as a C-DRX based switching scheme, such as using a switching scheme based on non-overlapping DRX-cycles. The control message may comprise a request for a certain Discontinuous Reception, DRX, configuration for the second established radio connection with the second network node 400B. The request for the updated DRX configuration may comprise information indicative of a change, such as a modification, of the DRX configuration for the second established radio connection. The information indicative of the change of the DRX configuration may comprise one or more of a frame offset, an on-duration and a value of a DRX inactivity timer. The information indicative of the modification of the DRX configuration may be indicative of how the DRX-cycle is to be modified in order for the DRX-cycles of the established connections not to overlap. In one or more example methods, the information indicative of the modification of the DRX configuration may comprise one or more of a desired frame offset, a desired on-duration period, a desired value of a DRX inactivity timer. In one or more example methods, the information may be indicative of a modification of a DRX periodicity. The information indicative of the modification of the DRX configuration may in one or more examples be indicative of a start of an on-duration period of the DRX-cycle. The information indicative of the modification of the DRX configuration may be indicative of an ending of an on-duration period of the DRX-cycle. In one or more example methods, the wireless device may trigger an ending of the on-duration of the DRX-cycle.

This is similar to step S106 and S106A of the method disclosed in FIG. 2 and step S204 and S204A relating to the DRX-cycle of the method disclosed in FIG. 5A.

The second network node may send a DRX configuration 1005, such as an updated DRX-configuration, for the second established radio connection to the wireless device 300. The DRX-configuration for the second established radio connection may be a DRX-configuration which is non-overlapping with the DRX-configuration of the first established radio connection, such that an on-duration of the DRX-cycle for the second established radio connection does not overlap in time with an on-duration and/or a DRX inactivity timer of the DRX-cycle for the first established radio connection. This is similar to step S107 of the method disclosed in FIG. 2 and step S206 relating to the DRX-cycle of the method disclosed in FIG. 5A.

Once the WD 300 has established connections with the first network node 400A and the second network node 400B, the WD 300 initiates communication 1006 with one of the first and the second network nodes 400A, 400B, such as over the first established radio connection and the second established radio connection at a time. The WD 300 may start communicating data over the first established connection with the first network node 400A when an on-duration of the DRX-cycle for the first established radio connection starts. This is similar to S108 of the method disclosed in FIG. 2 and step S207 of the method disclosed in FIG. 5A.

The WD 300 communicates data 1007 with, such as to/from, the network node 400A over the first established radio connection. In other words, the first network node schedules data on the first established radio connection during the on-duration of the DRX-cycle for the first established radio connection. Scheduling of data on the second established radio connection is paused since the DRX-cycle for the second established radio connection does not overlap with the DRX-cycle for the first established radio connection. This is similar to S108 of the method disclosed in FIG. 2 and step S207 of the method disclosed in FIG. 5A.

When a subscriber switch event occurs, such as when the on-duration and/or the inactivity timer of the DRX-cycle for the first established radio connection ends 1008A and/or when an on-duration of the DRX-cycle for the second established radio connection starts 1008B, the WD 300 switches from communicating over the first established radio connection with the first network node 400A to communicating over the second established radio connection with the second network node 400B. Upon ending of the on-duration and/or the inactivity timer of the DRX-cycle for the first established radio connection, the first network node 400A pauses scheduling of data on the first established radio connection. This is similar to S110, S110A of the method disclosed in FIGS. 2 and S208B of the method disclosed in FIG. 5A and S210 of the method disclosed in FIG. 5B. Upon start of the on-duration of the DRX-cycle for the second established radio connection the second network node 400B starts/restarts scheduling of data on the second established radio connection. This is similar to S110, S110B of the method disclosed in FIGS. 2 and S212 and S214 of the method disclosed in FIG. 5B.

The WD 300 proceeds to communicates data 1009 with, such as to/from, the network node 400B over the second established radio connection. In other words, the second network node 400B schedules data on the second established radio connection during the on-duration of the DRX-cycle for the second established radio connection. Scheduling of data on the first established radio connection is paused since the DRX-cycle for the first established radio connection does not overlap with the DRX-cycle for the second established radio connection. This is similar to S108 of the method disclosed in FIG. 2 and step S207 of the method disclosed in FIG. 5A.

The WD 300 then proceeds to switch back and forth between the first and the second established radio connections based on the DRX-cycles for the established radio connections. In other words, the WD 300 may repeat 1007, 1008A, 1008B in order to switch back and forth between the established radio connections using non-overlapping DRX-cycles of the established radio connections.

Examples of methods and products (wireless device and network node) according to the disclosure are set out in the following items:

Item 1. A method, performed by a wireless device, for simultaneous communication using a plurality of subscriber identities, the method comprising:

establishing (S102), with a first network node, a first radio connection associated with a first subscriber identity out of the plurality of subscriber identities, establishing (S104), with a second network node, a second radio connection associated with the second subscriber identity out of the plurality of subscriber identities, transmitting (S106), to the first and/or the second network node, a control message indicating that the wireless device intends to communicate simultaneously using more than one of the plurality of subscriber identities, and communicating (S108) over one of the first and the second established radio connections at a time, wherein scheduling of data on one of the first and the second established radio connections is paused during time periods when the wireless device is communicating using the other established radio connection.

Item 2. The method according to Item 1, wherein the method comprises:

informing (S106A) the network node about timings of switching between the first and the second established radio connections.

Item 3. The method according to Item 1 or 2, wherein the method comprises:

upon determining that a subscriber switch event has occurred, switching (S110) from communicating over the first established radio connection to communicating over the second established radio connection.

Item 4. The method according to Item 3, wherein the switching (S110) comprises transmitting (S110A) to one of the first and the second network node a message instructing the network node to pause scheduling data, to enable communication on the other established radio connection with the other of the first and second network node.

Item 5. The method according to any one of the Items 3 to 4, wherein the switching (S110) comprises restarting (S110B) communication using the other established radio connection.

Item 6. The method according to Item 5, wherein restarting (S110B) communication comprises transmitting (S110BA) to the other of the first and the second network node a message instructing the network node to restart scheduling data.

Item 7. The method according to any one of the Items 4 to 6, wherein the message instructing the network node to pause scheduling data comprises a buffer status report.

Item 8. The method according to any one of the Items 4 to 7, wherein the message instructing the network node to pause scheduling data comprises a Medium Access Control, MAC, message.

Item 9. The method according to any one of the Items 3 to 8, wherein the subscriber switch event comprises one or more of expiry of an switching timer of one of the first and the second established radio connections, a data buffer associated with one of the first and the second established radio connections being empty and expiry of an inactivity timer.

Item 10. The method according to any one of the previous Items, wherein communicating (S108) data over the second established data connection comprises pausing (S108A) communicating data over the first established radio connection.

Item 11. The method according to any one of the previous Items, wherein the control message is indicative of one or more switching timers associated with the first established radio connection and/or the second established radio connection.

Item 12. The method according to any one of the previous Items 1 to 10, wherein the control message comprises a request for a certain Discontinuous Reception, DRX, configuration for one of the first and the second established radio connections.

Item 13. The method according to Item 12, wherein the request for the certain DRX configuration comprises information indicative of a modification of the DRX configuration for one of the first and the second established radio connections.

Item 14. The method according to Item 13, wherein the information indicative of the change of the DRX configuration comprises one or more of a desired frame offset, a desired on-duration, a desired value of an inactivity timer.

Item 15. The method according to any one of the Items 12 to 14, wherein the method comprises:
    receiving (S107), from the first and/or the second network node, information indicative of a DRX configuration for one of the first and the second established radio connections.

Item 16. The method according to any one of the previous Items, the control message indicating that the wireless device intends to communicate simultaneously using the plurality of subscriber identities is wherein transmitted (S106) during establishing (S102) of the first radio connection and/or during establishing (S104) of the second radio connection.

Item 17. The method according to any one of the previous Items, wherein the subscriber identities of the plurality of subscriber identities are different from each other.

Item 18. The method according to any of the previous Items, wherein the wireless device comprises a wireless interface with a radio transceiver comprising a single transmitter and/or receiver configured to communicate with the network node, wherein the radio transceiver is used for communicating using the first subscriber identity and the second subscriber identity.

Item 19. A method, performed in a network node, for enabling communication with a wireless device using a plurality of subscriber identities, the method comprising:
    establishing (S202) a radio connection to the wireless device, wherein the first radio connection is associated with a first subscriber identity out of the plurality of subscriber identities,
    receiving (S204), from the wireless device, a control message indicating that the wireless device intends to communicate simultaneously using more than one of the plurality of subscriber identities,
    communicating (S207) with the wireless device over the established radio connection, wherein scheduling of data at one of the first and the second established radio connections is paused during time periods when the wireless device indicates that it is communicating using another subscriber identity.

Item 20. The method according to Item 19, wherein the method comprises:
    receiving (S204A), from the wireless device, information about timings of switching between a first and a second established radio connection and scheduling (S207A) data based on the received information.

Item 21. The method according to Item 19 or 20, wherein the method comprises:
    obtaining (S208) an indication that scheduling of data for the established radio connection is to be paused, and pausing (S210) scheduling of data for the established radio connection.

Item 22. The method according to Item 21, wherein obtaining (S208) an indication that scheduling of data is to be paused comprises:
    receiving (S208A), from the wireless device, a message instructing the network node to pause scheduling of data for the established radio connection.

Item 23. The method according to Item 22, wherein the message indicating that the network node is to pause scheduling of data for the established radio connection comprises a buffer status report.

Item 24. The method according to Item 21, wherein obtaining (S208) an indication that scheduling of data is to be paused comprises:
    determining (S208B) that an inactivity timer or an switching timer for the established radio connection has expired.

Item 25. The method according to Item 19 or 24, wherein obtaining (S208) an indication that scheduling of data is to be paused comprises:
    determining (S208C) that a data buffer for the established radio connection is empty.

Item 26. The method according to Item 19 to 25, wherein the method comprises:

obtaining (S212) an indication that scheduling of data for the established radio connection is to be restarted, and restarting (S214) scheduling of data for the established radio connection.

Item 27. The method according to Item 26, wherein obtaining (S212) an indication that scheduling of data for the established radio connection is to be restarted comprises:

receiving (S212A), from the wireless device, a message indicating that the network node is to restart scheduling of data for the established radio connection.

Item 28. The method according to Item 26, wherein obtaining (S212) an indication that scheduling of data for the established radio connection is to be restarted comprises:

determining (S212B) that an on-duration is scheduled for the established radio connection.

Item 29. The method according to any one of the Items 19 to 28, wherein the control message is indicative of one or more switching timers associated with the established radio connection.

Item 30. The method according to any one of the Items 19 to 28, wherein the control message received from the wireless device comprises a request for an updated Discontinuous Reception, DRX, configuration for the established radio connection.

Item 31. The method according to Item 30, wherein the request for the updated DRX configuration comprises information indicative of a change of the DRX configuration.

Item 32. The method according to Item 31, wherein the information indicative of the change of the DRX configuration comprises one or more of a frame offset, an on-duration and a value of an inactivity timer.

Item 33. The method according to any one of the Items 30 to 32, wherein the method comprises:

determining (S205) an updated DRX configuration for the established radio connection based on the received request.

Item 34. The method according to any one of the Items 30 to 33, wherein the method comprises:

transmitting (S206), to the wireless device, information indicative of an updated DRX configuration for the established radio connection.

Item 35. A wireless device comprising memory circuitry, processor circuitry, and a wireless interface, wherein the wireless device is configured to perform any of the methods according to any of Items 1-18.

Item 36. A network node comprising memory circuitry, processor circuitry, and a wireless interface, wherein the network node is configured to perform any of the methods according to any of Items 19-34.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-9 comprise some circuitries or operations which are illustrated with a solid line and some circuitries or operations which are illustrated with a dashed line. Circuitries or operations which are comprised in a solid line are circuitries or operations which are comprised in the broadest example. Circuitries or operations which are comprised in a dashed line are examples which may be comprised in, or a part of, or are further circuitries or operations which may be taken in addition to circuitries or operations of the solid line examples. It should be appreciated that these operations need not be performed in order presented. Furthermore, it should be appreciated that not all of the operations need to be performed. The example operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units" or "devices" may be represented by the same item of hardware.

The various example methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

The invention claimed is:

1. A method, performed by a wireless device, for simultaneous communication using a plurality of subscriber identities, the method comprising:

establishing, with a first network node, a first radio connection associated with a first subscriber identity out of the plurality of subscriber identities, establishing, with a second network node, a second radio connection associated with the second subscriber identity out of the plurality of subscriber identities, transmitting, to the first and/or the second network node via radio resource control (RRC) signaling, a control message indicating that the wireless device intends to communicate simultaneously using more than one of the plurality of subscriber identities, wherein the control message is transmitted during establishing of the first radio connection and/or during establishing of the second radio connection, receiving, from the first and/or the second network node, information indicative of an updated DRX configuration determined based on the control message, and communicating over one of the first and the second established radio connections at a time based upon the control message and updated DRX configuration, wherein scheduling of data on one of the first and the second established radio connections is paused during time periods when the wireless device is communicating using the other established radio connection.

2. The method according to claim 1, wherein the method comprises:

informing the network node about timings of switching between the first and the second established radio connections.

3. The method according to claim 1, wherein the method comprises:

upon determining that a subscriber switch event has occurred, switching from communicating over the first established radio connection to communicating over the second established radio connection.

4. The method according to claim 3, wherein the switching comprises transmitting to one of the first and the second network node a message instructing the network node to pause scheduling data, to enable communication on the other established radio connection with the other of the first and second network node.

5. The method according to claim 3, wherein the switching comprises restarting communication using the other established radio connection.

6. The method according to claim 5, wherein restarting communication comprises transmitting to the other of the first and the second network node a message instructing the network node to restart scheduling data.

7. The method according to claim 4, wherein the message instructing the network node to pause scheduling data comprises a buffer status report.

8. The method according to claim 4, wherein the message instructing the network node to pause scheduling data comprises a Medium Access Control (MAC) message.

9. The method according to claim 3, wherein the subscriber switch event comprises one or more of expiry of an switching timer of one of the first and the second established radio connections, a data buffer associated with one of the first and the second established radio connections being empty and expiry of an inactivity timer.

10. The method according to claim 1, wherein communicating data over the second established data connection comprises pausing communicating data over the first established radio connection.

11. The method according to claim 1, wherein the control message is indicative of one or more switching timers associated with the first established radio connection and/or the second established radio connection.

12. The method according to claim 1, wherein the control message comprises a request for a certain Discontinuous Reception (DRX) configuration for one of the first and the second established radio connections.

13. The method according to claim 12, wherein the request for the certain DRX configuration comprises information indicative of a modification of the DRX configuration for one of the first and the second established radio connections.

14. The method according to claim 13, wherein the information indicative of the change of the DRX configuration comprises one or more of a desired frame offset, a desired on-duration, a desired value of an inactivity timer.

15. The method according to claim 12, wherein the method comprises:

receiving, from the first network node, information indicative of an updated DRX configuration for the first established radio connection; and receiving, from the second network node, information indicative of an updated DRX configuration for the second established radio connection.

16. The method according to claim 1, wherein the subscriber identities of the plurality of subscriber identities are different from each other.

17. The method according to claim 1, wherein the wireless device comprises a wireless interface with a radio transceiver comprising a single transmitter and/or receiver configured to communicate with the network node, wherein the radio transceiver is used for communicating using the first subscriber identity and the second subscriber identity.

18. A method, performed in a network node, for enabling communication with a wireless device using a plurality of subscriber identities, the method comprising:

establishing a radio connection to the wireless device, wherein the first radio connection is associated with a first subscriber identity out of the plurality of subscriber identities, receiving, via radio resource control (RRC) signaling from the wireless device, a control message indicating that the wireless device intends to communicate simultaneously using more than one of the plurality of subscriber identities, wherein the control message is transmitted during establishing of the first radio connection, transmitting, to the wireless device, information indicative of an updated DRX configuration determined based on the received control message; and communicating with the wireless device over the established radio connection based upon the control message and updated DRX configuration, wherein scheduling of data at one of the first radio connection and a second radio connection is paused during time periods when the wireless device indicates that it is communicating using another subscriber identity.

19. The method according to claim 18, wherein the method comprises:

receiving, from the wireless device, information about timings of switching between a first and a second established radio connection and scheduling data based on the received information.

* * * * *